US012272309B2

(12) United States Patent
Jung et al.

(10) Patent No.: US 12,272,309 B2
(45) **Date of Patent: *Apr. 8, 2025**

(54) SENSING CIRCUIT, DISPLAY DEVICE AND METHOD OF OPERATING A SENSING CIRCUIT

(71) Applicant: Samsung Display Co., Ltd., Yongin-si (KR)

(72) Inventors: Hayong Jung, Hwaseong-si (KR); Jung-Taek Kim, Seoul (KR); Joonsuk Baik, Suwon-si (KR); Jaehoon Shin, Hwaseong-si (KR); Wook Lee, Hwaseong-si (KR)

(73) Assignee: SAMSUNG DISPLAY CO., LTD., Gyeonggi-do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/432,846

(22) Filed: Feb. 5, 2024

(65) Prior Publication Data

US 2024/0177671 A1 May 30, 2024

Related U.S. Application Data

(63) Continuation of application No. 17/986,342, filed on Nov. 14, 2022, now Pat. No. 11,915,650.

(30) Foreign Application Priority Data

Apr. 4, 2022 (KR) ........................ 10-2022-0041571

(51) Int. Cl.
*G09G 3/3233* (2016.01)

(52) U.S. Cl.
CPC .................... *G09G 3/3233* (2013.01); *G09G 2300/0426* (2013.01); *G09G 2300/0819* (2013.01);
(Continued)

(58) Field of Classification Search
CPC combination set(s) only.
See application file for complete search history.

(56) References Cited

U.S. PATENT DOCUMENTS

2022/0028330 A1* 1/2022 Hwang ................ G09G 3/2003

FOREIGN PATENT DOCUMENTS

KR 102075920 B1 2/2020
KR 1020210022811 A 3/2021
(Continued)

*Primary Examiner* — Sanjiv D. Patel
(74) *Attorney, Agent, or Firm* — CANTOR COLBURN LLP

(57) ABSTRACT

A sensing circuit of a display device includes a sensing line initialization circuit which substantially simultaneously initializes a first sensing line and a second sensing line in a first sub-sensing period of a sensing period, a first line selection switch which couples the first sensing line to a sensing channel in the first sub-sensing period, a second line selection switch which couples the second sensing line to the sensing channel in a second sub-sensing period of the sensing period, and the sensing channel which samples a first sensing voltage of the first sensing line in a first sampling period of the first sub-sensing period, and samples a second sensing voltage of the second sensing line in a second sampling period of the second sub-sensing period. The second sensing line is not initialized during a period from the first sampling period to the second sampling period.

28 Claims, 22 Drawing Sheets

(52) U.S. Cl.
CPC ............... *G09G 2300/0852* (2013.01); *G09G 2310/08* (2013.01); *G09G 2320/0233* (2013.01); *G09G 2320/045* (2013.01)

(56) References Cited

FOREIGN PATENT DOCUMENTS

| | | | | |
|---|---|---|---|---|
| KR | 102252048 | B1 | * | 5/2021 |
| KR | 1020210083946 | A | | 7/2021 |

* cited by examiner

SENSING CIRCUIT, DISPLAY DEVICE AND METHOD OF OPERATING A SENSING CIRCUIT

This application is a continuation of U.S. patent application Ser. No. 17/986,342, filed on Nov. 14, 2022, which claims priority to Korean Patent Application No. 10-2022-0041571, filed on Apr. 4, 2022, and all the benefits accruing therefrom under 35 U.S.C. § 119, the content of which in its entirety is herein incorporated by reference.

BACKGROUND

1. Field

Embodiments of the inventive concept relate to a display device, and more particularly to a sensing circuit, a display device including the sensing circuit, and a method of operating the sensing circuit.

2. Description of the Related Art

Even when a plurality of pixels included in a display device, such as an organic light-emitting diode ("OLED") display device, is manufactured by the same process, driving transistors of the plurality of pixels may have different driving characteristics (e.g., different threshold voltages) from each other due to a process variation, or the like. Thus, the plurality of pixels may emit light with different luminance. Further, as the display device operates over time, the plurality of pixels may degrade, and the driving characteristics of the driving transistors may degrade. To compensate for initial non-uniformity of luminance and for the degradation, the display device may include a sensing circuit performing a sensing operation that senses the driving characteristics of the driving transistors of the plurality of pixels.

Recently, to reduce a size of the sensing circuit, a sensing circuit which performs the sensing operation for two or more sensing lines by one sensing channel is being developed.

SUMMARY

In a sensing circuit having a reduced size, a sensing time may be increased.

Some embodiments provide a sensing circuit capable of reducing a sensing time.

Some embodiments provide a display device including a sensing circuit capable of reducing a sensing time.

Some embodiments provide a method of operating a sensing circuit capable of reducing a sensing time.

In an embodiment of the disclosure, there is provided a sensing circuit of a display device. The sensing circuit includes a sensing line initialization circuit which substantially simultaneously initializes a first sensing line and a second sensing line in a first sub-sensing period of a sensing period, a first line selection switch which couples the first sensing line to a sensing channel in the first sub-sensing period, a second line selection switch which couples the second sensing line to the sensing channel in a second sub-sensing period of the sensing period, and the sensing channel which samples a first sensing voltage of the first sensing line in a first sampling period of the first sub-sensing period, and samples a second sensing voltage of the second sensing line in a second sampling period of the second sub-sensing period. The second sensing line is not initialized during a period from the first sampling period to the second sampling period.

In an embodiment, in the first sub-sensing period, after the first and second sensing lines are initialized, a voltage of the first sensing line may become the first sensing voltage for a first pixel coupled to the first sensing line, and a voltage of the second sensing line may become the second sensing voltage for a second pixel coupled to the second sensing line. The voltage of the second sensing line may be maintained as the second sensing voltage until the second sampling period of the second sub-sensing period.

In an embodiment, the second sampling period may be shorter than the first sampling period.

In an embodiment, the sensing line initialization circuit may include a first sensing line initialization switch which applies an initialization voltage to the first sensing line in response to a sensing line initialization signal, and a second sensing line initialization switch which applies the initialization voltage to the second sensing line in response to the sensing line initialization signal.

In an embodiment, the sensing channel may include a sampling capacitor including a first electrode and a second electrode, a first sampling switch which couples the first and second line selection switches to the first electrode of the sampling capacitor in response to a sampling signal, and a first reference switch which applies a reference voltage to the second electrode of the sampling capacitor in response to a reference signal.

In an embodiment, the sensing circuit may further include a reference channel and a channel connection switch. The reference channel may include a reference capacitor including a first electrode and a second electrode, a second sampling switch which applies an initialization voltage to the first electrode of the reference capacitor in response to the sampling signal, and a second reference switch which applies the reference voltage to the second electrode of the reference capacitor in response to the reference signal. The channel connection switch may couple the first electrode of the sampling capacitor and the first electrode of the reference capacitor to each other in response to a channel connection signal.

In an embodiment, the sensing circuit may further include an analog-to-digital converter, and a switch matrix which couples the sensing channel and the reference channel to the analog-to-digital converter.

In an embodiment, the sensing period may include the first sub-sensing period in which a first sensing operation for a first pixel coupled to the first sensing line is performed, the second sub-sensing period in which a second sensing operation for a second pixel coupled to the second sensing line is performed, and a data output period in which first sensing data corresponding to the first sensing voltage and second sensing data corresponding to the second sensing voltage are output. The first sub-sensing period may include a sensing line initialization period in which the first sensing line and the second sensing line are substantially simultaneously initialized, a first capacitor initialization period in which the sampling capacitor and the reference capacitor are initialized, the first sampling period in which the first sensing voltage of the first sensing line is sampled, and a first analog-to-digital conversion period in which the first sensing voltage is converted into the first sensing data. The second sub-sensing period may include the second sampling period in which the second sensing voltage of the second sensing line is sampled, and a second analog-to-digital conversion period in which the second sensing voltage is converted into the second sensing data.

In an embodiment, in the sensing line initialization period, a sensing line initialization signal may have an active level. The sensing line initialization circuit may apply the initialization voltage to the first sensing line and the second sensing line in response to the sensing line initialization signal having the active level.

In an embodiment, in the first capacitor initialization period, the sampling signal, the reference signal and the channel connection signal may have an active level. The second sampling switch may be turned on in response to the sampling signal having the active level, the channel connection switch may be turned on in response to the channel connection signal having the active level, the initialization voltage may be applied to the first electrode of the reference capacitor through the second sampling switch, and the initialization voltage may be applied to the first electrode of the sampling capacitor through the second sampling switch and the channel connection switch. The first reference switch and the second reference switch may be turned on in response to the reference signal having the active level, the reference voltage may be applied to the second electrode of the sampling capacitor through the first reference switch, and the reference voltage may be applied to the second electrode of the reference capacitor through the second reference switch.

In an embodiment, the first capacitor initialization period may overlap the sensing line initialization period.

In an embodiment, in the first sampling period, a first line selection signal, the sampling signal and the reference signal may have an active level, and a second line selection signal and the channel connection signal may have an inactive level. The first line selection switch may be turned on in response to the first line selection signal having the active level, the first sampling switch and the second sampling switch may be turned on in response to the sampling signal having the active level, the first sensing voltage of the first sensing line may be applied to the first electrode of the sampling capacitor through the first line selection switch and the first sampling switch, and the initialization voltage may be applied to the first electrode of the reference capacitor through the second sampling switch. The first reference switch and the second reference switch may be turned on in response to the reference signal having the active level, the reference voltage may be applied to the second electrode of the sampling capacitor through the first reference switch, and the reference voltage may be applied to the second electrode of the reference capacitor through the second reference switch.

In an embodiment, in the first analog-to-digital conversion period, the channel connection signal may have an active level. The channel connection switch may couple the first electrode of the sampling capacitor and the first electrode of the reference capacitor to each other in response to the channel connection signal having the active level, and the second electrode of the sampling capacitor and the second electrode of the reference capacitor may have a first voltage difference between the first sensing voltage and the initialization voltage. The switch matrix may couple the second electrode of the sampling capacitor and the second electrode of the reference capacitor to the analog-to-digital converter, and the analog-to-digital converter may convert the first voltage difference into the first sensing data.

In an embodiment, in the second sampling period, a second line selection signal, the sampling signal and the reference signal may have an active level, and a first line selection signal and the channel connection signal may have an inactive level. The second line selection switch may be turned on in response to the second line selection signal having the active level, the first sampling switch and the second sampling switch may be turned on in response to the sampling signal having the active level, the second sensing voltage of the second sensing line may be applied to the first electrode of the sampling capacitor through the second line selection switch and the first sampling switch, and the initialization voltage may be applied to the first electrode of the reference capacitor through the second sampling switch. The first reference switch and the second reference switch may be turned on in response to the reference signal having the active level, the reference voltage may be applied to the second electrode of the sampling capacitor through the first reference switch, and the reference voltage may be applied to the second electrode of the reference capacitor through the second reference switch.

In an embodiment, in the second analog-to-digital conversion period, the channel connection signal may have an active level. The channel connection switch may couple the first electrode of the sampling capacitor and the first electrode of the reference capacitor to each other in response to the channel connection signal having the active level, and the second electrode of the sampling capacitor and the second electrode of the reference capacitor may have a second voltage difference between the second sensing voltage and the initialization voltage. The switch matrix may couple the second electrode of the sampling capacitor and the second electrode of the reference capacitor to the analog-to-digital converter, and the analog-to-digital converter may convert the second voltage difference into the second sensing data.

In an embodiment, the second sub-sensing period may further include a second capacitor initialization period in which the sampling capacitor and the reference capacitor are initialized.

In an embodiment, a display panel of the display device may include N odd-numbered sensing lines including the first sensing line and N even-numbered sensing lines including the second sensing line, where N is an integer greater than 0. The sensing circuit may include the sensing line initialization circuit which initializes the N odd-numbered sensing lines and the N even-numbered sensing lines, N sensing channels including the sensing channel, N first line selection switches including the first line selection switch, the N first line selection switches which couple the N odd-numbered sensing lines to the N sensing channels in the first sub-sensing period, N second line selection switches including the second line selection switch, the N second line selection switches which couple the N even-numbered sensing lines to the N sensing channels in the second sub-sensing period, an analog-to-digital converter, and a switch matrix which sequentially couples the N sensing channels to the analog-to-digital converter in a first analog-to-digital conversion period of the first sub-sensing period, and sequentially couples the N sensing channels to the analog-to-digital converter in a second analog-to-digital conversion period of the second sub-sensing period. The analog-to-digital converter may sequentially convert N first sensing voltages of the N odd-numbered sensing lines into N first sensing data in the first analog-to-digital conversion period, and may sequentially convert N second sensing voltages of the N even-numbered sensing lines into N second sensing data in the second analog-to-digital conversion period.

In an embodiment, the sensing circuit may further include a data output unit which sequentially stores the N first sensing data in the first analog-to-digital conversion period, sequentially stores the N second sensing data in the second analog-to-digital conversion period, and outputs the N first sensing data and the N second sensing data in a data output period of the sensing period.

In an embodiment, the data output unit may rearrange the N first sensing data and the N second sensing data such that each of the N second sensing data is disposed between adjacent two of the N first sensing data.

In an embodiment, the sensing line initialization circuit may include a common initialization switch which applies an initialization voltage to the first sensing line, and applies the initialization voltage to the second sensing line through the first line selection switch and the second line selection switch.

In an embodiment, the sensing channel may include a first sampling capacitor which samples the first sensing voltage of the first sensing line in the first sampling period, and a second sampling capacitor which samples the second sensing voltage of the second sensing line in the second sampling period.

In an embodiment, a display panel of the display device may include M sensing lines including the first sensing line and the second sensing line, where M is an integer greater than 2. The sensing circuit may further include third through M-th line selection switches which couple the sensing channel to third though M-th sensing lines among the M sensing lines in third through M-th sub-sensing periods of the sensing period, respectively. The sensing channel may sample third through M-th sensing voltages of the third though M-th sensing lines in the third through M-th sub-sensing periods.

In an embodiment of the invention, there is provided a display device including a display panel including a plurality of pixels, a scan driver which provides a scan signal and a sensing signal to a corresponding pixel of the plurality of pixels, a data driver which provides a data signal to the corresponding pixel of the plurality of pixels, a sensing circuit coupled to the plurality of pixels through a plurality of sensing lines, and a controller which controls the scan driver, the data driver and the sensing circuit. The sensing circuit includes a sensing line initialization circuit which substantially simultaneously initializes the plurality of sensing lines in a first sub-sensing period of a sensing period, a first line selection switch which couples a first sensing line of the plurality of sensing lines to a sensing channel in the first sub-sensing period, a second line selection switch which couples a second sensing line of the plurality of sensing lines to the sensing channel in a second sub-sensing period of the sensing period, and the sensing channel which samples a first sensing voltage of the first sensing line in a first sampling period of the first sub-sensing period, and samples a second sensing voltage of the second sensing line in a second sampling period of the second sub-sensing period. The second sensing line is not initialized during a period from the first sampling period to the second sampling period.

In an embodiment, there is provided a method of operating a sensing circuit of a display device. In the method, a first sensing line and a second sensing line are substantially simultaneously initialized in a first sub-sensing period of a sensing period, the first sensing line is coupled to a sensing channel in the first sub-sensing period, a first sensing voltage of the first sensing line is sampled by the sensing channel in a first sampling period of the first sub-sensing period, the second sensing line is coupled to the sensing channel in a second sub-sensing period of the sensing period, and a second sensing voltage of the second sensing line is sampled by the sensing channel in a second sampling period of the second sub-sensing period. The second sensing line is not initialized during a period from the first sampling period to the second sampling period.

As described above, in a sensing circuit, a display device and a method of operating the sensing circuit in embodiments, the sensing circuit may perform a sensing operation for two or more sensing lines by one sensing channel. Accordingly, a size of the sensing circuit may be reduced.

Further, in the sensing circuit, the display device and the method of operating the sensing circuit in embodiments, a sensing channel may sample a first sensing voltage of a first sensing line in a first sampling period of a first sub-sensing period, and may sample a second sensing voltage of a second sensing line in a second sampling period of a second sub-sensing period. The second sensing line may not be initialized during a period from the first sampling period to the second sampling period. Accordingly, a sensing time of the sensing circuit may be reduced.

BRIEF DESCRIPTION OF THE DRAWINGS

Illustrative, non-limiting embodiments will be more clearly understood from the following detailed description in conjunction with the accompanying drawings.

DETAILED DESCRIPTION

Figure 1:
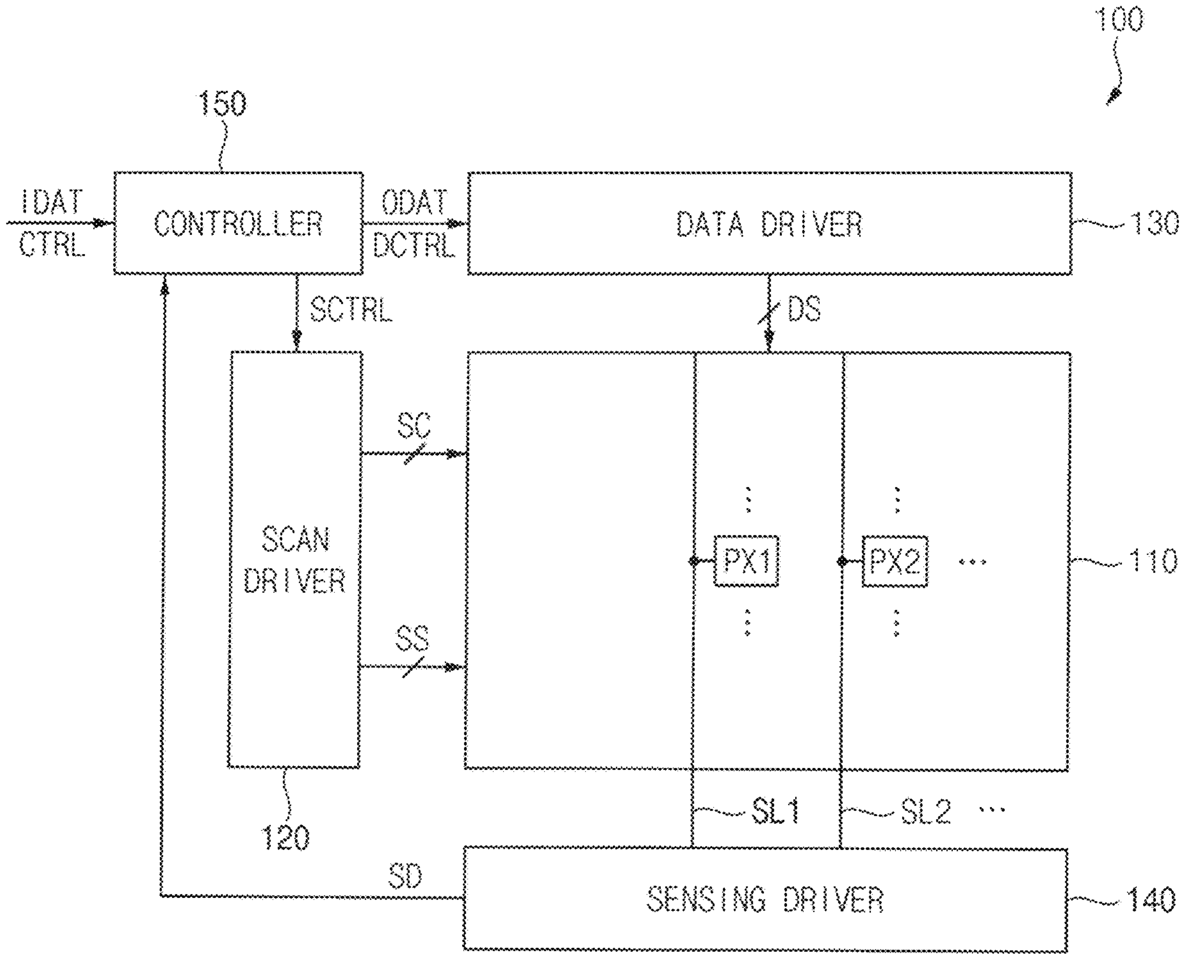
FIG. 1 is a block diagram illustrating an embodiment of a display device.

Hereinafter, embodiments of the inventive concept will be explained in detail with reference to the accompanying drawings.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). The term such as "about" can mean within one or more standard deviations, or within ±30%, 20%, 10%, 5% of the stated value, for example.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein. The term such as "unit" may be a hardware component such as a circuit, for example.

Figure 2:
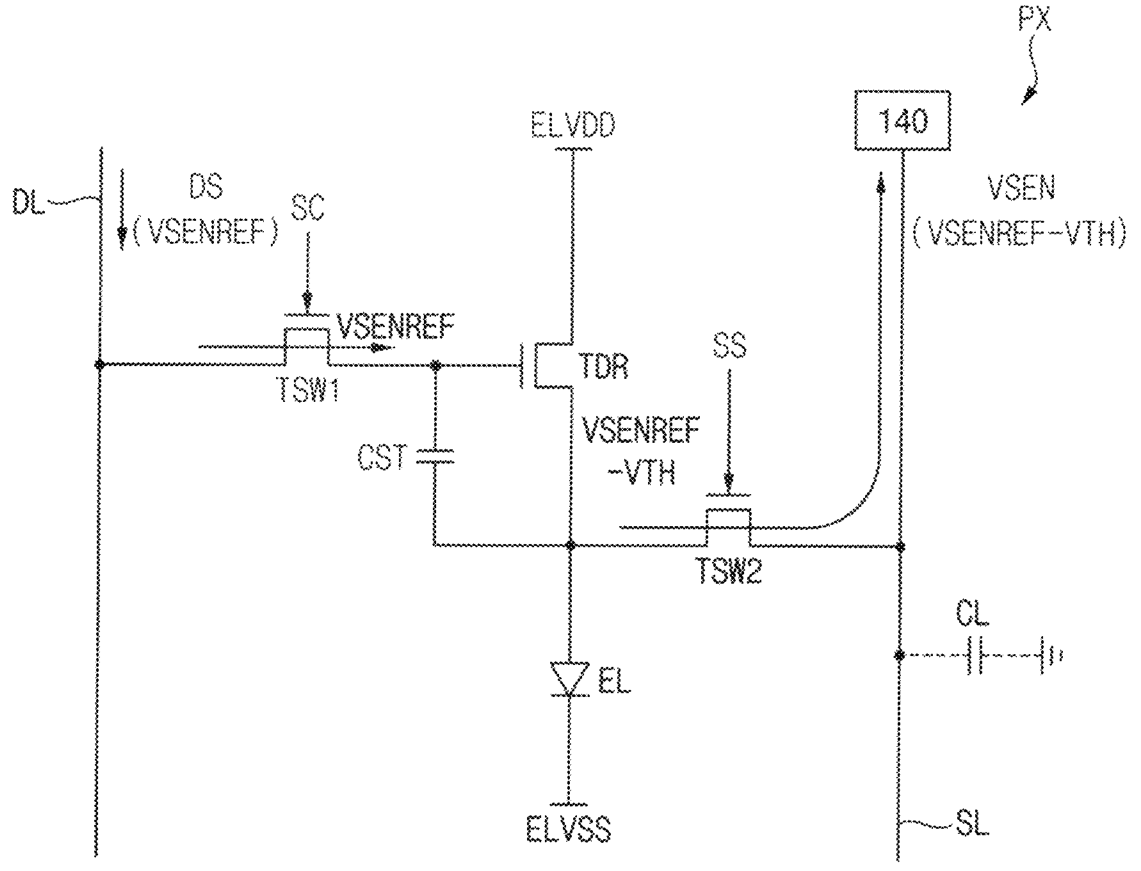
FIG. 2 is a circuit diagram illustrating an embodiment of a pixel included in a display device.
Figure 3:
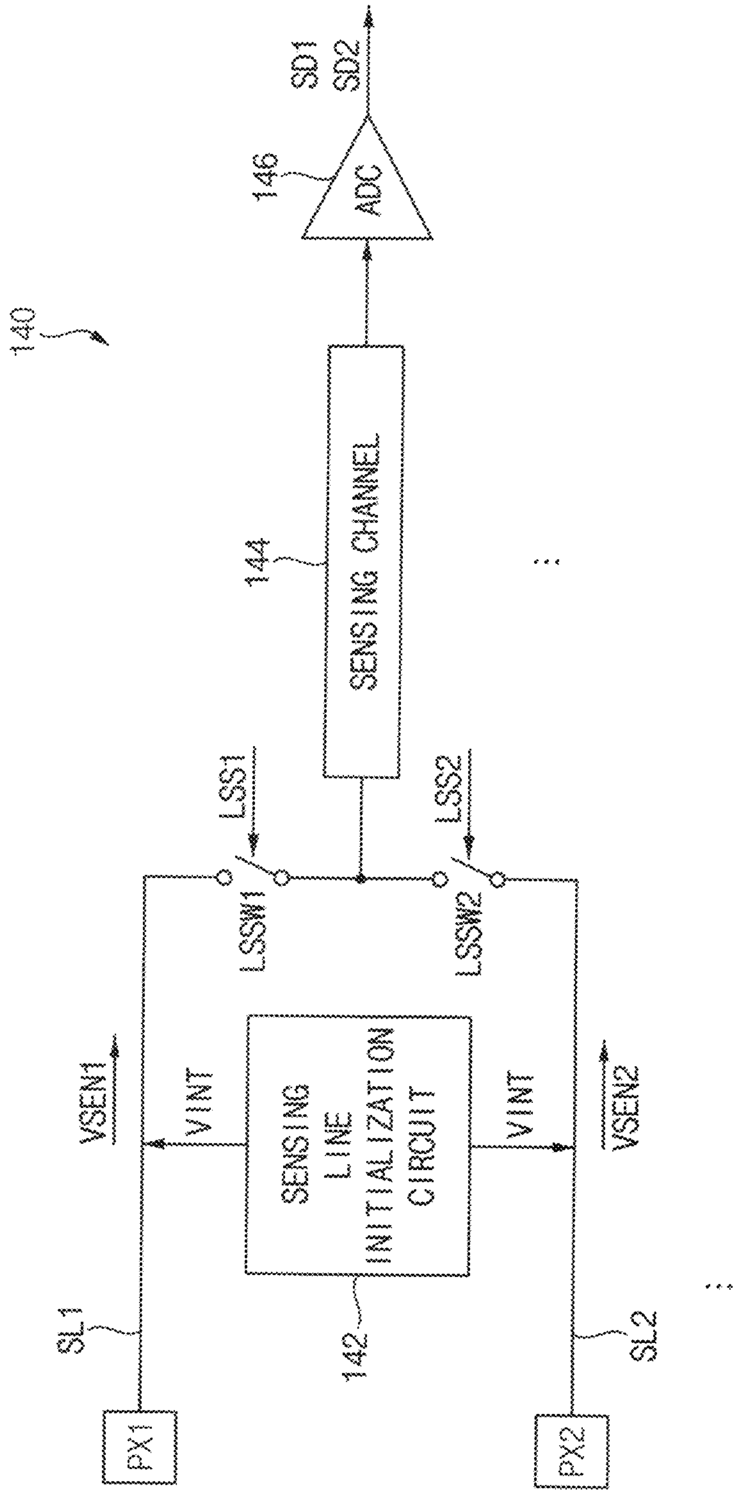
FIG. 3 is a block diagram illustrating an embodiment of a sensing circuit.

FIG. 1 is a block diagram illustrating an embodiment of a display device, FIG. 2 is a circuit diagram illustrating an embodiment of a pixel included in a display device, and FIG. 3 is a block diagram illustrating an embodiment of a sensing circuit.

Referring to FIG. 1, a display device 100 in embodiments may include a display panel 110 that includes a plurality of pixels PX1 and PX2, a scan driver 120 that provides a scan signal SC and a sensing signal SS to corresponding pixels of the plurality of pixels PX1 and PX2, a data driver 130 that provides a data signal DS to corresponding pixels of the plurality of pixels PX1 and PX2, a sensing circuit (also referred to as a sensing driver) 140 that is coupled to the plurality of pixels PX1 and PX2 through a plurality of sensing lines SL1 and SL2, and a controller 150 that controls the scan driver 120, the data driver 130 and the sensing circuit 140.

The display panel 110 may include a plurality of data lines, a plurality of scan lines, a plurality of sensing signal lines, the plurality of sensing lines SL1 and SL2, and the plurality of pixels coupled thereto. In some embodiments, each pixel PX may include a light-emitting element, and the display panel 110 may be a light-emitting display panel. In an embodiment, the light-emitting element may be an organic light-emitting diode ("OLED"), and the display panel 110 may be an OLED display panel, for example. In other embodiments, the light-emitting element may be a nano light-emitting diode ("NED"), a quantum dot ("QD") light-emitting diode, a micro light-emitting diode, an inorganic light-emitting diode, or any other suitable light-emitting element.

In an embodiment, as illustrated in FIGS. 2, each pixel PX may include a first switching transistor TSW1 that transfers the data signal DS (or a sensing reference voltage VSENREF) of the data line DL to a storage capacitor CST in response to the scan signal SC, a storage capacitor CST that stores the data signal DS transferred by the first switching transistor TSW1, a driving transistor TDR that generates a driving current based on the data signal DS stored in the storage capacitor CST, the light-emitting element EL that emits light based on the driving current generated by the driving transistor TDR, and a second switching transistor TSW2 that couples one terminal (e.g., a source) of the driving transistor TDR to a sensing line SL in response to the sensing signal SS, for example. The sensing line SL may have a parasitic capacitor CL. In an embodiment, one of a source electrode or a drain electrode may receive a first power voltage ELVDD. In an embodiment, one of a cathode and an anode of the light-emitting element EL may receive a power voltage ELVSS.

In a sensing period, the scan driver 120 may provide the scan signal SC and the sensing signal SS to each pixel PX in a selected pixel row, and the data driver 130 may provide the sensing reference voltage VSENREF to each pixel PX in the selected pixel row. The first switching transistor TSW1 may transfer the sensing reference voltage VSENREF to a gate of the driving transistor TDR. When the sensing reference voltage VSENREF is applied to the gate of the driving transistor TDR, a voltage of the one terminal (e.g., the source) of the driving transistor TDR may be saturated to a voltage VSENREF-VTH where a threshold voltage VTH of the driving transistor TDR is subtracted from the sensing reference voltage VSENREF. The second switching transistor TSW2 may transfer the voltage VSENREF-VTH of the one terminal of the driving transistor TDR to the sensing line SL in response to the sensing signal SS, and the sensing circuit 140 may sense, as a sensing voltage VSEN of the sensing line SL, the voltage VSENREF-VTH where the threshold voltage VTH of the driving transistor TDR is subtracted from the sensing reference voltage VSENREF.

Although FIG. 2 illustrates an embodiment of the pixel PX, the pixel PX of the display device 100 in embodiments is not limited to the embodiment of FIG. 2. Further, the display panel 110 is not limited to the light-emitting display panel, and may be any suitable display panel.

Referring back to FIG. 1, the scan driver 120 may generate the scan signals SC and the sensing signals SS based on a scan control signal SCTRL from the controller 150, and may sequentially provide the scan signals SC and the sensing signals SS to the plurality of pixels PX1 and PX2 on a pixel row basis. In some embodiments, the scan control signal SCTRL may include, but not limited to, a scan start signal and a scan clock signal. In some embodiments, the scan driver 120 may be integrated or formed in a peripheral portion of the display panel 110. In other embodiments, the scan driver 120 may be implemented with one or more integrated circuits.

The data driver 130 may generate the data signals DS based on output image data ODAT and a data control signal DCTRL received from the controller 150, and may provide the data signals DS to the plurality of pixels PX1 and PX2. In some embodiments, the data driver 130 may provide the sensing reference voltage VSENREF to the plurality of pixels PX1 and PX2 in the selected pixel row. In some embodiments, the data control signal DCTRL may include a horizontal start signal, an output data enable signal and a load signal. In some embodiments, the data driver 130 may be implemented with one or more integrated circuits. In other embodiments, the data driver 130 and the controller 150 may be implemented with a single integrated circuit, and the single integrated circuit may be also referred to as a timing controller embedded data driver ("TED") integrated circuit.

The sensing circuit 140 may sense characteristics (e.g., the threshold voltage VTH and/or a mobility of the driving transistor TDR) of the plurality of pixels PX1 and PX2 in the selected pixel row through the plurality of sensing lines SL1 and SL2. The sensing circuit 140 may generate sensing data SD by sensing the plurality of pixels PX1 and PX2, and may provide the sensing data SD to the controller 150. In some embodiments, the sensing circuit 140 may be implemented with a separate integrated circuit from an integrated circuit of the data driver 130. In other embodiments, the sensing circuit 140 may be included in the data driver 130, or may be included in the controller 150.

The controller 150 (e.g., a timing controller ("TCON")) may receive input image data IDAT and a control signal CTRL from an external host processor (e.g., a graphics processing unit ("GPU"), an application processor ("AP") or a graphics card). In some embodiments, the control signal CTRL may include, but not limited to, a vertical synchronization signal, a horizontal synchronization signal, an input data enable signal, a master clock signal, etc. The controller 150 may generate the output image data ODAT by correcting the input image data IDAT based on the sensing data SD. Further, the controller 150 may generate the data control signal DCTRL and the scan control signal SCTRL based on the control signal CTRL. The controller 150 may control an operation of the scan driver 120 by providing the scan control signal SCTRL to the scan driver 120, and may control an operation of the data driver 130 by providing the output image data ODAT and the data control signal DCTRL to the data driver 130.

In the display device 100 in embodiments, the sensing circuit 140 may perform a sensing operation for the pixels PX1 and PX2 in a selected pixel row in each sensing period. In some embodiments, the sensing circuit 140 may perform the sensing operation when the display device 100 is powered off. In an embodiment, when the display device 100 is powered off, the sensing circuit 140 may sequentially perform sensing operations for a plurality of pixel rows in a plurality of sensing periods, for example. In other embodiments, the sensing circuit 140 may perform the sensing operation while the display device 100 operates. In an embodiment, while the display device 100 operates, the sensing circuit 140 may perform a sensing operation for at least one pixel row in at least one sensing period within a vertical blank period. However, a period in which the sensing operation is performed, or the sensing period is not limited to being at the power-off or with the vertical blank period, for example.

Further, the sensing circuit 140 may perform a sensing operation for two or more sensing lines SL1 and SL2 by one sensing channel in a time division manner. In an embodiment, each sensing period may include a first sub-sensing period and a second sub-sensing period, for example. The sensing circuit 140 may perform a sensing operation for a first sensing line SL1 by one sensing channel in the first sub-sensing period, and may perform a sensing operation for a second sensing line SL2 by the sensing channel in the second sub-sensing period. Accordingly, compared with a sensing circuit including one sensing channel for each sensing line, a size of the sensing circuit 140 may be reduced. To perform these operations, as illustrated in FIG. 3, the sensing circuit 140 may include a sensing line initialization circuit 142, first and second line selection switches LSSW1 and LSSW2, a sensing channel 144 and an analog-to-digital converter ("ADC") 146. Although FIG. 3 illustrates, for convenience of explanation, two sensing lines SL1 and SL2 and one sensing channel 144, the number of the sensing lines SL1 and SL2 and the number of the sensing channel 144 are not limited to an embodiment of FIG. 3.

The sensing line initialization circuit 142 may substantially simultaneously initialize the first sensing line SL1 and the second sensing line SL2 in the first sub-sensing period of the sensing period. In an embodiment, in a sensing line initialization period of the first sub-sensing period, the sensing line initialization circuit 142 may initialize the first sensing line SL1 and the second sensing line SL2 by providing an initialization voltage VINT to the first sensing line SL1 and the second sensing line SL2, for example.

The first line selection switch LSSW1 may couple the first sensing line SL1 to the sensing channel 144 in the first sub-sensing period, and the second line selection switch LSSW2 may couple the second sensing line SL2 to the sensing channel 144 in the second sub-sensing period of the sensing period. In an embodiment, a first line selection signal LSS1 may have an active level in at least a portion of the first sub-sensing period, and the first line selection switch LSSW1 may couple the first sensing line SL1 to the sensing channel 144 in response to the first line selection signal LSS1 having the active level, for example. Further, a second line selection signal LSS2 may have the active level in at least a portion of the second sub-sensing period, and the second line selection switch LSSW2 may couple the second sensing line SL2 to the sensing channel 144 in response to the second line selection signal LSS2 having the active level.

The sensing channel 144 may sample a first sensing voltage VSEN1 of the first sensing line SL1, or the first sensing voltage VSEN1 for a first pixel PX1 coupled to the first sensing line SL1 in a first sampling period of the first sub-sensing period, and the ADC 146 may convert the first sensing voltage VSEN1 into first sensing data SD1 in a first analog-to-digital conversion period of the first sub-sensing period. Further, the sensing channel 144 may sample a second sensing voltage VSEN2 of the second sensing line SL2, or the second sensing voltage VSEN2 for a second pixel PX2 coupled to the second sensing line SL2 in a second sampling period of the second sub-sensing period, and the ADC 146 may convert the second sensing voltage VSEN2 into second sensing data SD2 in a second analog-to-digital conversion period of the second sub-sensing period. Further, the sensing circuit 140 may provide the first sensing data SD1 and the second sensing data SD2 to the controller 150 in a data output period of the sensing period.

In the sensing circuit 140 in embodiments, the second sensing line SL2 may not be initialized during a period from the first sampling period in which the first sensing voltage VSEN1 of the first sensing line SL1 is sampled to the second sampling period in which the second sensing voltage VSEN2 of the second sensing line SL2 is sampled. In the first sub-sensing period, after the first and second sensing lines SL1 and SL2 are initialized, a voltage of the first sensing line SL1 may become (or may be saturated to) the first sensing voltage VSEN1 for the first pixel PX1 coupled to the first sensing line SL1, and a voltage of the second sensing line SL2 may become (or may be saturated to) the second sensing voltage VSEN2 for the second pixel PX2 coupled to the second sensing line SL2. The voltage of the second sensing line SL2 may be maintained as the second sensing voltage VSEN2 until the second sampling period of the second sub-sensing period. Thus, in the second sampling period of the second sub-sensing period, without additionally initializing and charging (or saturating) the second sensing line SL2, the sensing channel 144 may sample the second sensing voltage VSEN2 of the second sensing line SL2 that is saturated in the first sub-sensing period. Accordingly, a sensing time of the sensing circuit 140 may be reduced.

In some embodiments, the second sampling period may be shorter than the first sampling period. Thus, compared with a time desired for sampling the first sensing voltage VSEN1 of the first sensing line SL1 in an initialization state, a time desired for sampling the second sensing voltage VSEN2 of the second sensing line SL2 in a state where the sensing voltage VSEN1 is stored may be relatively short, and thus a time length of the second sampling period may be set to be shorter than a time length of the first sampling period. Accordingly, the sensing time of the sensing circuit 140 may be further reduced.

Further, after the first and second sensing data SD1 and SD2 are generated, the sensing circuit 140 in embodiments may output the first and second sensing data SD1 and SD2 all at once. Accordingly, the sensing time of the sensing circuit 140 may be further reduced.

In a conventional sensing circuit having a 2:1 sensing manner which performs a sensing operation for two sensing lines by one sensing channel, a first sensing line (e.g., an odd-numbered sensing line) may be initialized, a sensing operation for the first sensing line may be performed, and then a second sensing line (e.g., an even-numbered sensing line) may be initialized. Thereafter, a sensing operation for the second sensing line may be performed. That is, in the conventional sensing circuit, the second sensing line may be initialized after the sensing operation for the first sensing line and before the sensing operation for the second sensing line. However, as described above, in the sensing circuit 140 in embodiments, the second sensing line SL2 may not be initialized during the period from the first sampling period to the second sampling period. Accordingly, compared with a sensing time of the conventional sensing circuit, the sensing time of the sensing circuit 140 may be reduced.

Further, in the conventional sensing circuit, after the sensing operation for the first sensing line is performed, sensing data for the first sensing line may be output. Thereafter, the sensing operation for the second sensing line may be performed, and then sensing data for the second sensing line may be output. That is, in the conventional sensing circuit, the sensing data for the first sensing line and the sensing data for the second sensing line may be output in separate periods. However, as described above, the sensing circuit 140 in embodiments may output the first and second sensing data SD1 and SD2 all at once after the first and second sensing data SD1 and SD2 are generated. Accordingly, the sensing time of the sensing circuit 140 may be further reduced.

Figure 4:
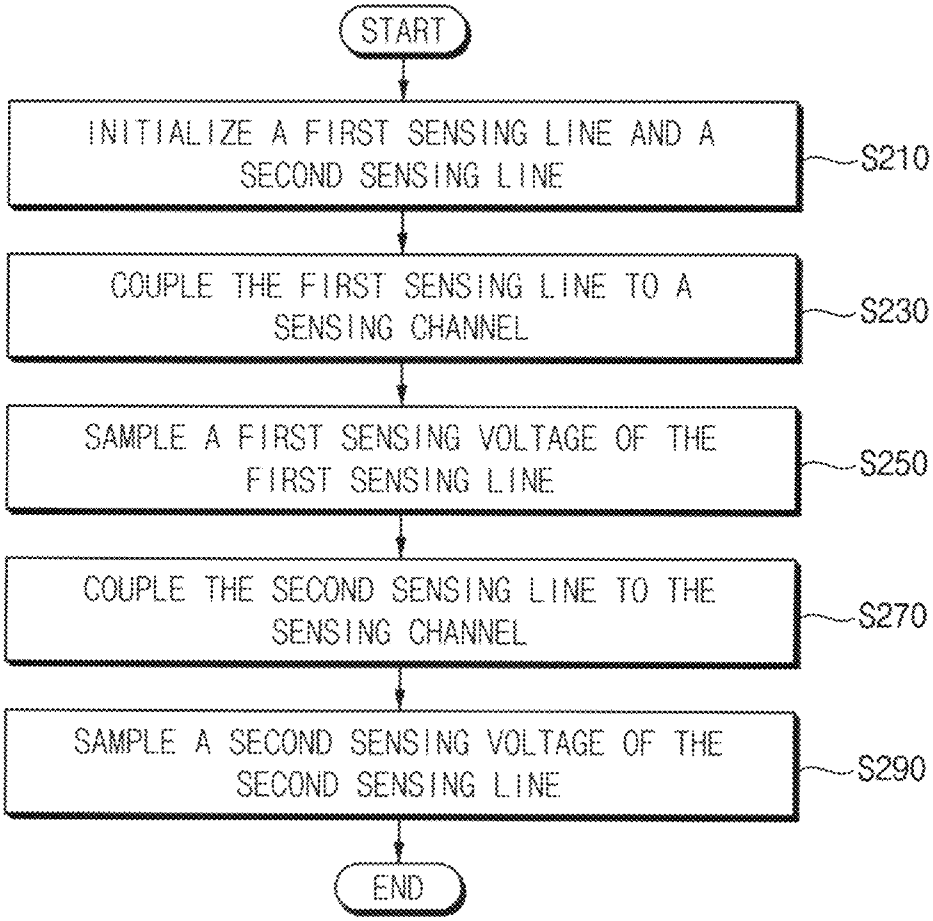
FIG. 4 is a flowchart illustrating an embodiment of a method of operating a sensing circuit.
Figure 5:
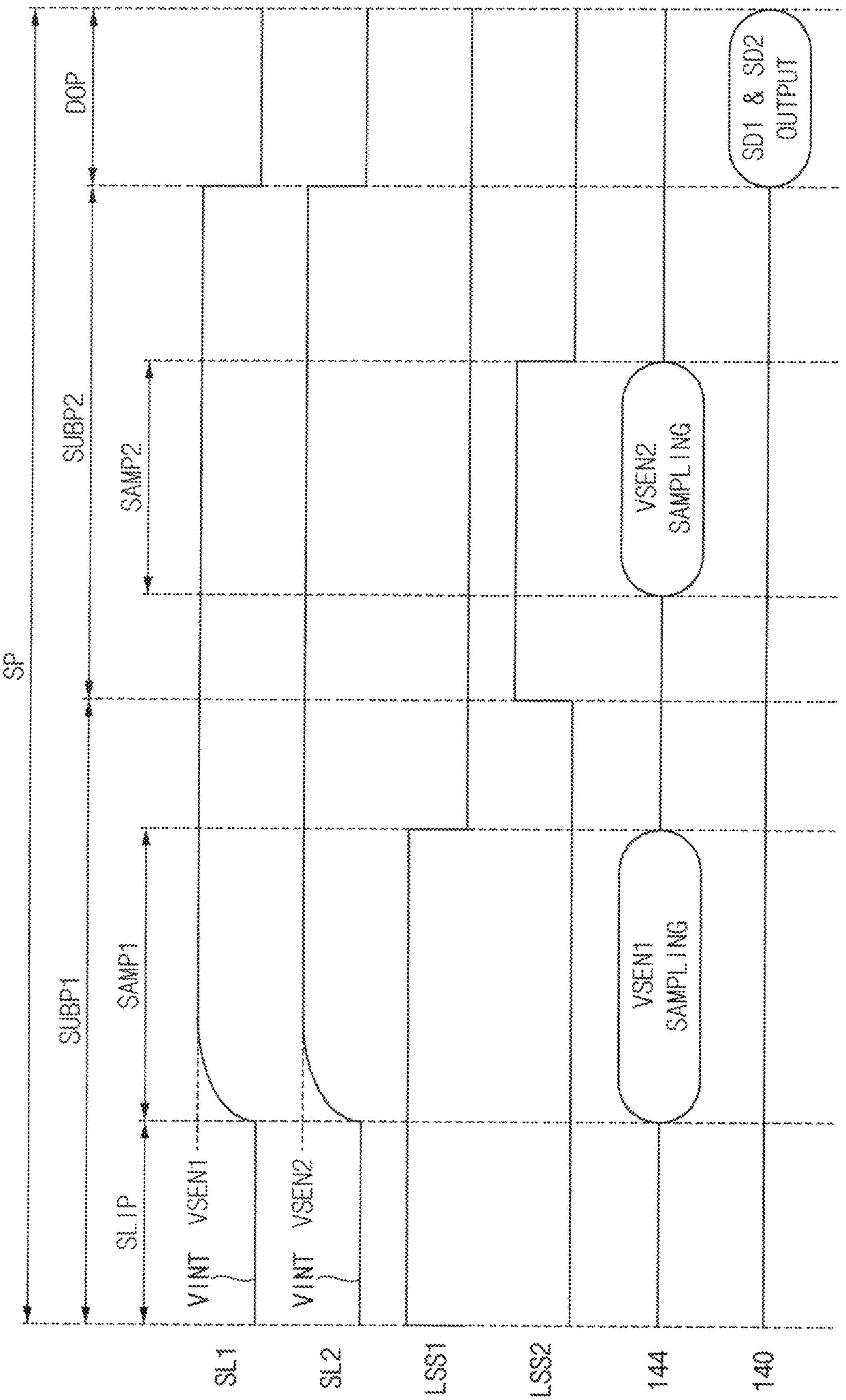
FIG. 5 is a timing diagram for describing an embodiment of an operation of a sensing circuit.

FIG. 4 is a flowchart illustrating a method of operating an embodiment of a sensing circuit, and FIG. 5 is a timing diagram for describing an operation of a sensing circuit.

Referring to FIGS. 3 through 5, in a method of operating a sensing circuit 140 in embodiments, a sensing period SP may include a first sub-sensing period SUBP1 in which a sensing operation for a first sensing line SL1 is performed, a second sub-sensing period SUBP2 in which a sensing operation for a second sensing line SL2 is performed, and a data output period DOP in which sensing data SD1 and SD2 are output. Further, the first sub-sensing period SUBP1 may include a sensing line initialization period SLIP and a first sampling period SAMP1, and the second sub-sensing period SUBP2 may include a second sampling period SAMP2.

In the sensing line initialization period SLIP of the first sub-sensing period SUBP1, a sensing line initialization circuit 142 may substantially simultaneously initialize the first sensing line SL1 and the second sensing line SL2 (S210). In an embodiment, the sensing line initialization circuit 142 may provide an initialization voltage VINT to the first sensing line SL1 and the second sensing line SL2 in the sensing line initialization period SLIP, and the first sensing line SL1 and the second sensing line SL2 may be initialized based on the initialization voltage VINT, for example.

In the first sub-sensing period SUBP1, a first line selection switch LSSW1 may couple the first sensing line SL1 to a sensing channel 144 (S230). In an embodiment, a first line selection signal LSS1 may have an active level in the sensing line initialization period SLIP and the first sampling period SAMP1 of the first sub-sensing period SUBP1, and the first line selection switch LSSW1 may couple the first sensing line SL1 to the sensing channel 144 in response to the first line selection signal LSS1 having the active level, for example.

In the first sampling period SAMP1 of the first sub-sensing period SUBP1, a voltage of the first sensing line SL1 may be saturated to a first sensing voltage VSEN1 for a first pixel PX1 coupled to the first sensing line SL1, and the sensing channel 144 may sample the first sensing voltage VSEN1 of the first sensing line SL1 (S250). In an embodiment, the sensing channel 144 may include a sampling capacitor, and may store the first sensing voltage VSEN1 of the first sensing line SL1 in the sampling capacitor, for example. The first sensing voltage VSEN1 sampled by the sensing channel 144, or the first sensing voltage VSEN1 stored in the sampling capacitor may be provided to an ADC 146, and the ADC 146 may convert the first sensing voltage VSEN1 into first sensing data SD1.

In the second sub-sensing period SUBP2, a second line selection switch LSSW2 may couple the second sensing line SL2 to the sensing channel 144 (S270). In an embodiment, a second line selection signal LSS2 may have an active level from a start time point of the second sub-sensing period SUBP2 to an end time point of the second sampling period SAMP2, and the second line selection switch LSSW2 may couple the second sensing line SL2 to the sensing channel 144 in response to the second line selection signal LSS2 having the active level, for example.

A voltage of the second sensing line SL2 may be saturated to a second sensing voltage VSEN2 for a second pixel PX2 coupled to the second sensing line SL2 in the first sampling period SAMP1 of the first sub-sensing period SUBP1, the voltage of the second sensing line SL2 may be maintained as the second sensing voltage VSEN2 until the second sampling period SAMP2 of the second sub-sensing period SUBP2, and the sensing channel 144 may sample the second sensing voltage VSEN2 of the second sensing line SL2 in the second sampling period SAMP2 of the second sub-sensing period SUBP2 (S290). In an embodiment, the sensing channel 144 may store the second sensing voltage VSEN2 of the second sensing line SL2 in the sampling capacitor, for example. The second sensing voltage VSEN2 sampled by the sensing channel 144, or the second sensing voltage VSEN2 stored in the sampling capacitor may be provided to the ADC 146, and the ADC 146 may convert the second sensing voltage VSEN2 into second sensing data SD2.

In the data output period DOP, the sensing circuit 140 may output the first and second sensing data SD1 and SD2 to a controller. The controller may correct input image data based on the first and second sensing data SD1 and SD2.

In the method of operating the sensing circuit 140 in embodiments, the second sensing line SL2 may not be again initialized during a period from the first sampling period SAMP1 to the second sampling period SAMP2. Thus, in the second sampling period SAMP2, the second sensing line SL2 may retain the second sensing voltage VSEN2 saturated in the first sampling period SAMP1, and the sensing channel 144 may sample the second sensing voltage VSEN2 of the second sensing line SL2 saturated in the first sampling period SAMP1. Accordingly, a sensing time of the sensing circuit 140 may be reduced. Further in some embodiments, the second sampling period SAMP2 may be shorter than the first sampling period SAMP1. Accordingly, the sensing time of the sensing circuit 140 may be further reduced.

Figure 6:
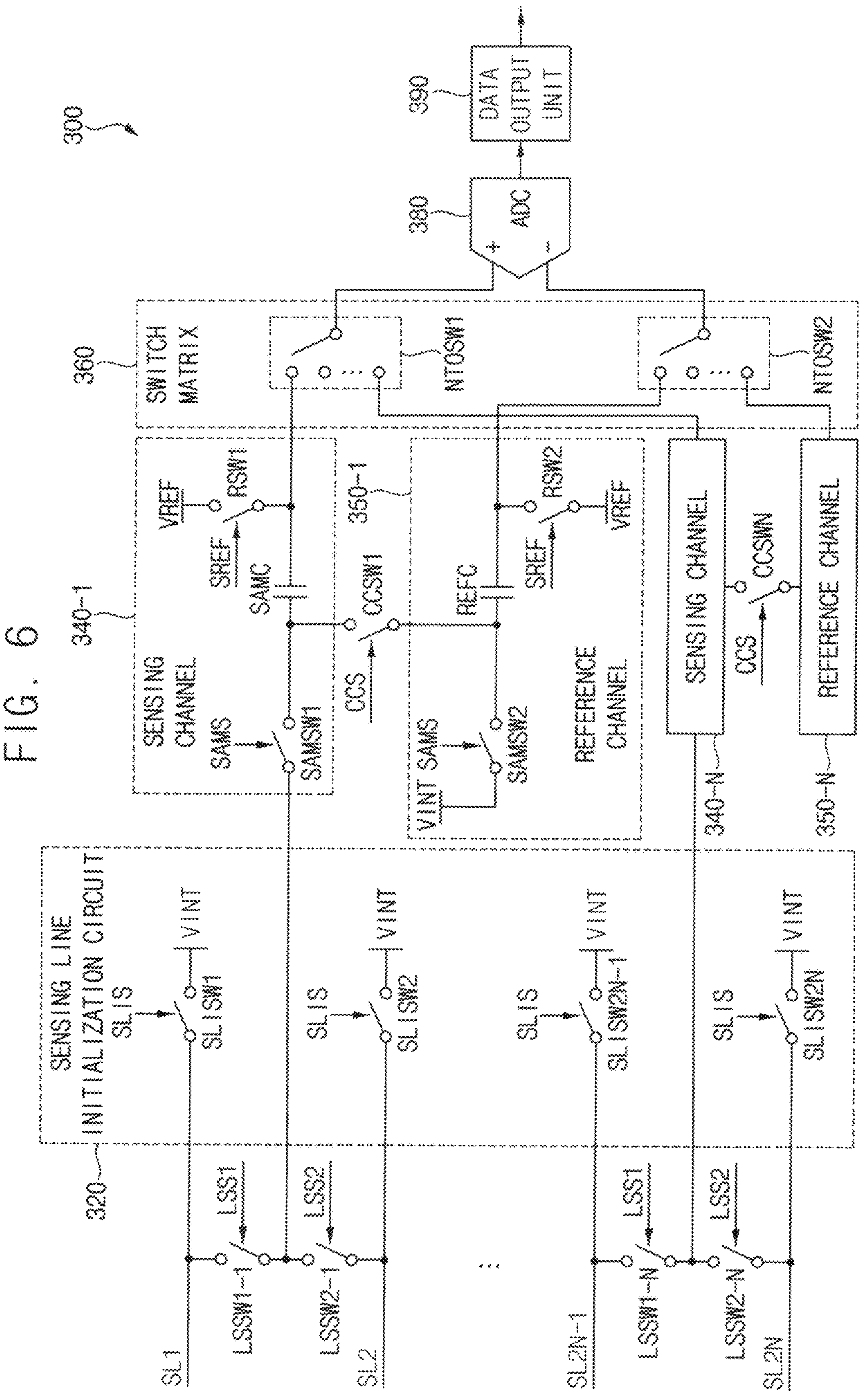
FIG. 6 is a diagram illustrating an embodiment of a sensing circuit.

FIG. 6 is a diagram illustrating an embodiment of a sensing circuit.

Referring to FIG. 6, a display device including a sensing circuit 300 may include 2N sensing lines SL1, SL2, . . . , SL2N−1 and SL2N, where N is an integer greater than 0, and the sensing circuit 300 in embodiments may include N first line selection switches LSSW1-1, LSSW1-N, N second line selection switches LSSW2-1, . . . , LSSW2-N, a sensing line initialization circuit 320, N sensing channels 340-1, . . . , 340-N, N reference channels 350-1, . . . , 350-N, N channel connection switches CCSW1, . . . , CCSWN, a switch matrix 360, an ADC 380 and a data output unit 390.

The N first line selection switches LSSW1-1, . . . , LSSW1-N may couple N odd-numbered sensing lines SL1, . . . , SL2N−1 to the N sensing channels 340-1, . . . , 340-N in a first sub-sensing period of a sensing period, respectively. In an embodiment, a first line selection signal LSS1 may have an active level in at least a portion of the first sub-sensing period, and the N first line selection switches LSSW1-1, . . . , LSSW1-N may respectively couple the N odd-numbered sensing lines SL1, . . . , SL2N−1 to the N sensing channels 340-1, . . . , 340-N in response to the first line selection signal LSS1 having the active level, for example.

The N second line selection switches LSSW2-1, . . . , LSSW2-N may couple N even-numbered sensing lines SL2, . . . , SL2N to the N sensing channels 340-1, . . . , 340-N in a second sub-sensing period of the sensing period, respectively. In an embodiment, a second line selection signal LSS2 may have the active level in at least a portion of the second sub-sensing period, and the N second line selection switches LSSW2-1, . . . , LSSW2-N may respectively couple the N even-numbered sensing lines SL2, . . . , SL2N to the N sensing channels 340-1, . . . , 340-N in response to the second line selection signal LSS2 having the active level, for example.

The sensing line initialization circuit 320 may initialize the 2N sensing lines SL1 through SL2N. In some embodiments, the sensing line initialization circuit 320 may include 2N sensing line initialization switches SLISW1, SLISW2, . . . , SLISW2N−1 and SLISW2N for initializing the 2N sensing lines SL1 through SL2N. In an embodiment, a first sensing line initialization switch SLISW1 may apply an initialization voltage VINT to a first sensing line SL1 in response to a sensing line initialization signal SLIS, a second sensing line initialization switch SLISW2 may apply the initialization voltage VINT to a second sensing line SL2 in response to the sensing line initialization signal SLIS, a (2N−1)-th sensing line initialization switch SLISW2N−1 may apply the initialization voltage VINT to a (2N−1)-th sensing line SL2N−1 in response to the sensing line initialization signal SLIS, a (2N)-th sensing line initialization switch SLISW2N may apply the initialization voltage VINT to a (2N)-th sensing line SL2N in response to the sensing line initialization signal SLIS, and the 2N sensing lines SL1 through SL2N may be initialized based on the initialization voltage VINT, for example.

The N sensing channels 340-1, . . . , 340-N may sample N first sensing voltages of the N odd-numbered sensing lines SL1, . . . , SL2N−1 in a first sampling period of the first sub-sensing period, respectively, and may sample N second sensing voltages of the N even-numbered sensing lines SL2, . . . , SL2N in a second sampling period of the second sub-sensing period, respectively. In some embodiments, each of the N sensing channels 340-1, . . . , 340-N may include a sampling capacitor SAMC, a first sampling switch SAMSW1 and a first reference switch RSW1. In an embodiment, the sampling capacitor SAMC may include a first electrode and a second electrode, for example. The first sampling switch SAMSW1 may couple corresponding first and second line selection switches LSSW1-1 and LSSW2-1 to the first electrode of the sampling capacitor SAMC in response to a sampling signal SAMS. The first reference switch RSW1 may apply a reference voltage VREF to the second electrode of the sampling capacitor SAMC in response to a reference signal SREF. In some embodiments, the reference voltage VREF may have, but not limited to, a voltage level (e.g., about 2 volts (V)) substantially the same as a voltage level of the initialization voltage VINT. In other embodiments, the reference voltage VREF may have a voltage level different from the voltage level of the initialization voltage VINT.

The N reference channels 350-1, . . . , 350-N may store a voltage (e.g., the initialization voltage VINT) that is used as a basis voltage with respect to the N first sensing voltages or the N second sensing voltages sampled by the N sensing channels 340-1, . . . , 340-N such that the ADC 380 may perform analog-to-digital conversion operations on voltage differences between voltages output from the N sensing channels 340-1, . . . , 340-N and voltages output from the N reference channels 350-1, . . . , 350-N. In some embodiments, each of the N reference channels 350-1, . . . , 350-N may include a reference capacitor REFC, a second sampling switch SAMSW2 and a second reference switch RSW2. In an embodiment, the reference capacitor REFC may include a first electrode and a second electrode, for example. The second sampling switch SAMSW2 may apply the initialization voltage VINT to the first electrode of the reference capacitor REFC in response to the sampling signal SAMS. The second reference switch RSW2 may apply the reference voltage VREF to the second electrode of the reference capacitor REFC in response to the reference signal SREF. Although FIG. 6 illustrates an embodiment where the second sampling switch SAMSW2 applies the initialization voltage VINT to the first electrode of the reference capacitor REFC, a voltage applied to the reference capacitor REFC by the second sampling switch SAMSW2 is not limited to the initialization voltage VINT. In an embodiment, the second sampling switch SAMSW2 may apply a ground voltage to the first electrode of the reference capacitor REFC, for example.

The N channel connection switches CCSW1, . . . , CCSWN may couple the first electrodes of the sampling capacitors SAMC of the N sensing channels 340-1, . . . , 340-N and the first electrodes of the reference capacitors REFC of corresponding N reference channels 350-1, . . . , 350-N to each other in response to a channel connection signal CCS. In an embodiment, a first channel connection switch CCSW1 may couple the first electrode of the sampling capacitor SAMC of a first sensing channel 340-1 and the first electrode of the reference capacitor REFC of a first reference channel 350-1 to each other in response to the channel connection signal CCS, and an N-th channel connection switch CCSWN may couple the first electrode of the sampling capacitor SAMC of an N-th sensing channel 340-N and the first electrode of the reference capacitor REFC of an N-th reference channel 350-N to each other in response to the channel connection signal CCS, for example.

The switch matrix 360 and the ADC 380 may sequentially convert the N first sensing voltages of the N odd-numbered sensing lines SL1, . . . , SL2N−1 sampled by the N sensing channels 340-1, . . . , 340-N into N first sensing data, and may sequentially convert the N second sensing voltages of the N even-numbered sensing lines SL2, . . . , SL2N sampled by the N sensing channels 340-1, . . . , 340-N into N second sensing data. In an embodiment, in a first analog-to-digital conversion period of the first sub-sensing period, the switch matrix 360 may sequentially couple the N sensing channels 340-1, . . . , 340-N to the ADC 380, the switch matrix 360 may further sequentially couple the N reference channels 350-1, . . . , 350-N to the ADC 380, and the ADC 380 may sequentially convert the N first sensing voltages of the N odd-numbered sensing lines SL1, . . . , SL2N−1 into the N first sensing data, for example. Further, in a second analog-to-digital conversion period of the second sub-sensing period, the switch matrix 360 may sequentially couple the N sensing channels 340-1, . . . , 340-N to the ADC 380, the switch matrix 360 may further sequentially couple the N reference channels 350-1, . . . , 350-N to the ADC 380, and the ADC 380 may sequentially convert the N second sensing voltages of the N even-numbered sensing lines SL2, . . . , SL2N into the N second sensing data. In some embodiments, the switch matrix 360 may include a first N-to-1 switch NTOSW1 that couples one of the N sensing channels 340-1, . . . , 340-N to a first input terminal (e.g., a positive input terminal) of the ADC 380, and a second N-to-1 switch NTOSW2 that couples one of the N reference channels 350-1, . . . , 350-N to a second input terminal (e.g., a negative input terminal) of the ADC 380. Although FIG. 6 illustrates an embodiment where a single ADC 380 sequentially performs the analog-to-digital conversion operations, in other embodiments, the sensing circuit 300 may include two through NADCs that substantially simultaneously perform the analog-to-digital conversion operations.

The data output unit 390 may sequentially store the N first sensing data in the first analog-to-digital conversion period, may sequentially store the N second sensing data in the second analog-to-digital conversion period, and may output the N first sensing data and the N second sensing data in a data output period of the sensing period. In some embodiments, the data output unit 390 may rearrange the N first sensing data and the N second sensing data such that each of the N second sensing data is disposed between adjacent two of the N first sensing data. In an embodiment, the data output unit 390 may rearrange the N first sensing data and the N second sensing data such that 2N sensing data for the first through (2N)-th sensing lines SL1 through SL2N are sequentially output, for example.

Hereinafter, an operation of the sensing circuit 300 in embodiments will be described below with reference to FIGS. 6 through 14.

Figure 7:
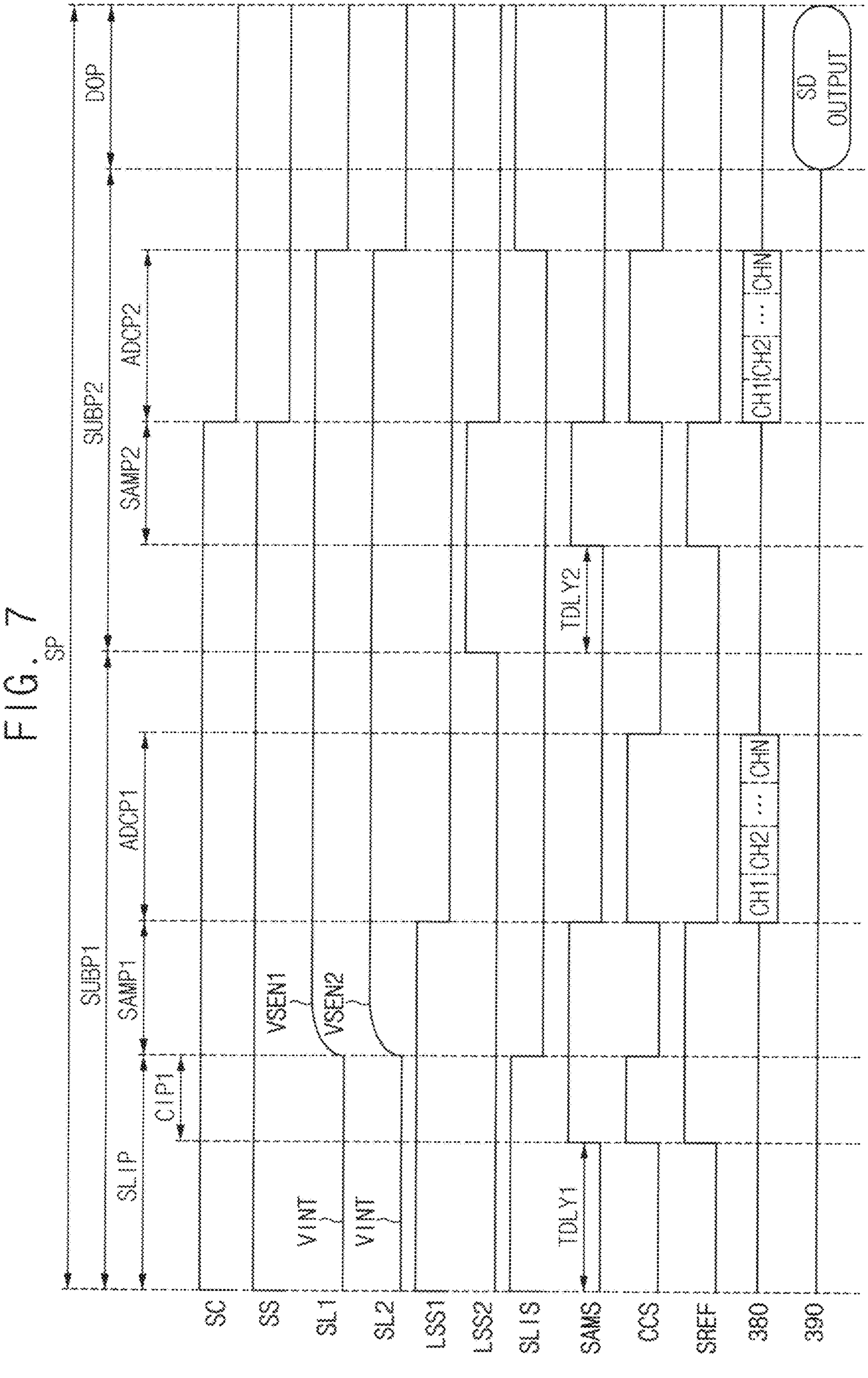
FIG. 7 is a timing diagram for describing an embodiment of an operation of a sensing circuit.
Figure 8:
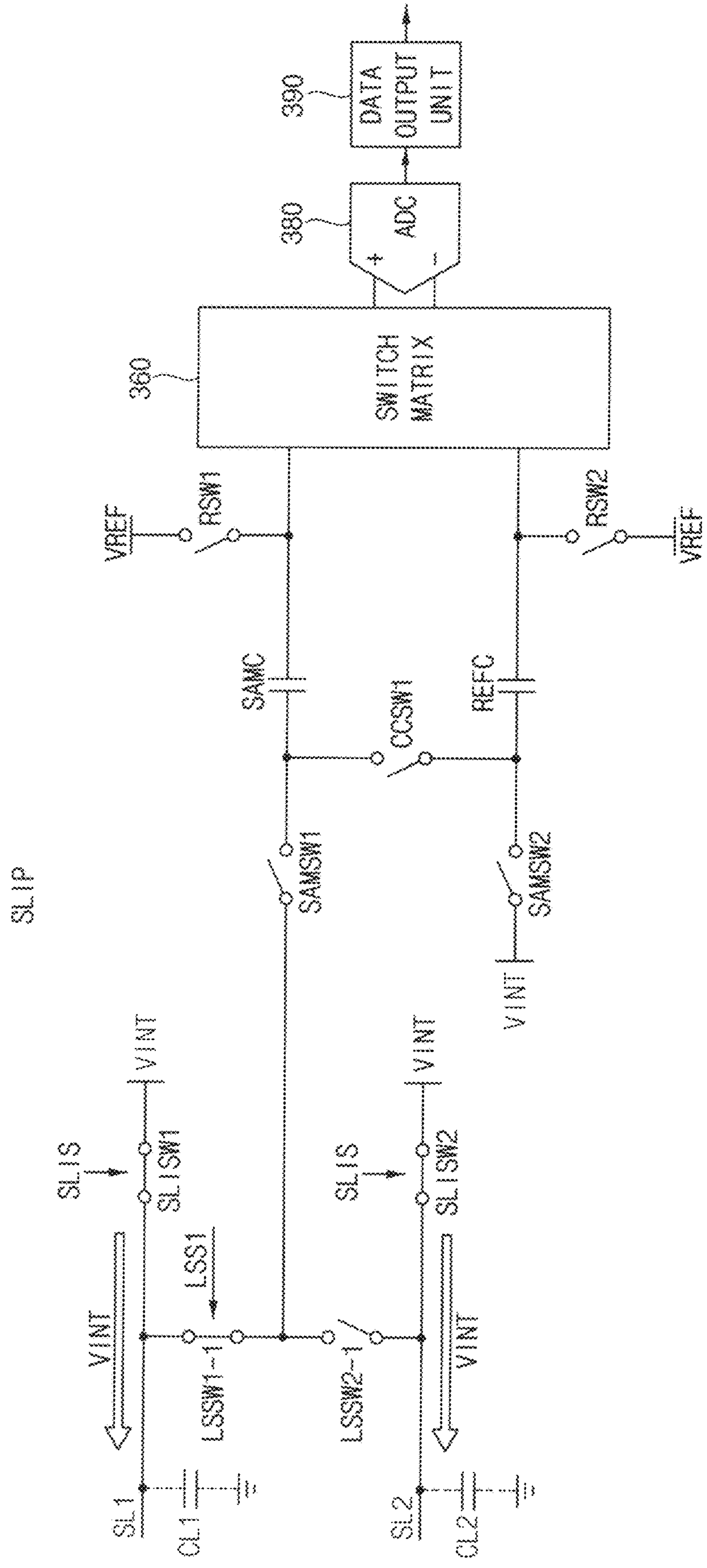
FIG. 8 is a diagram for describing an operation of a sensing circuit in a sensing line initialization period.
Figure 9:
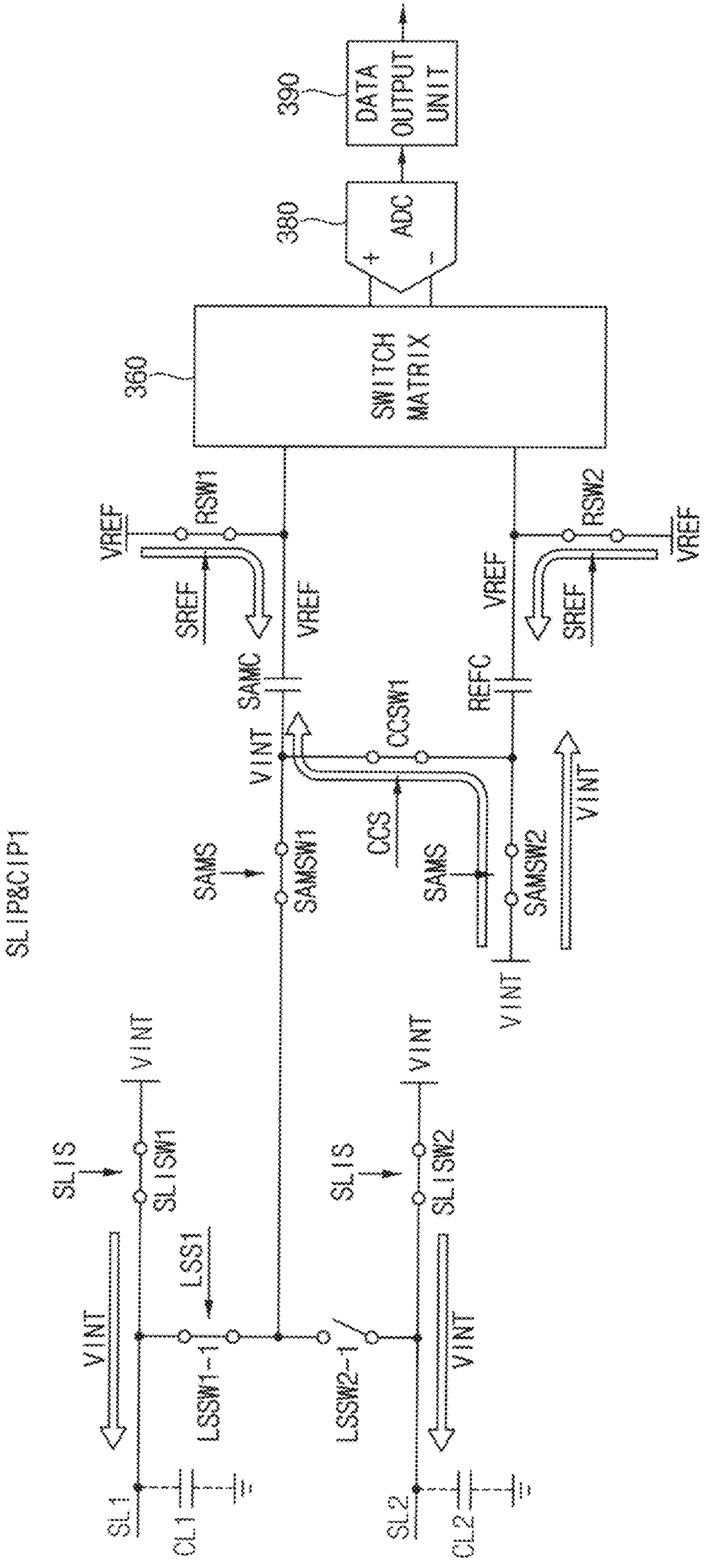
FIG. 9 is a diagram for describing an operation of a sensing circuit in a first capacitor initialization period.
Figure 10:
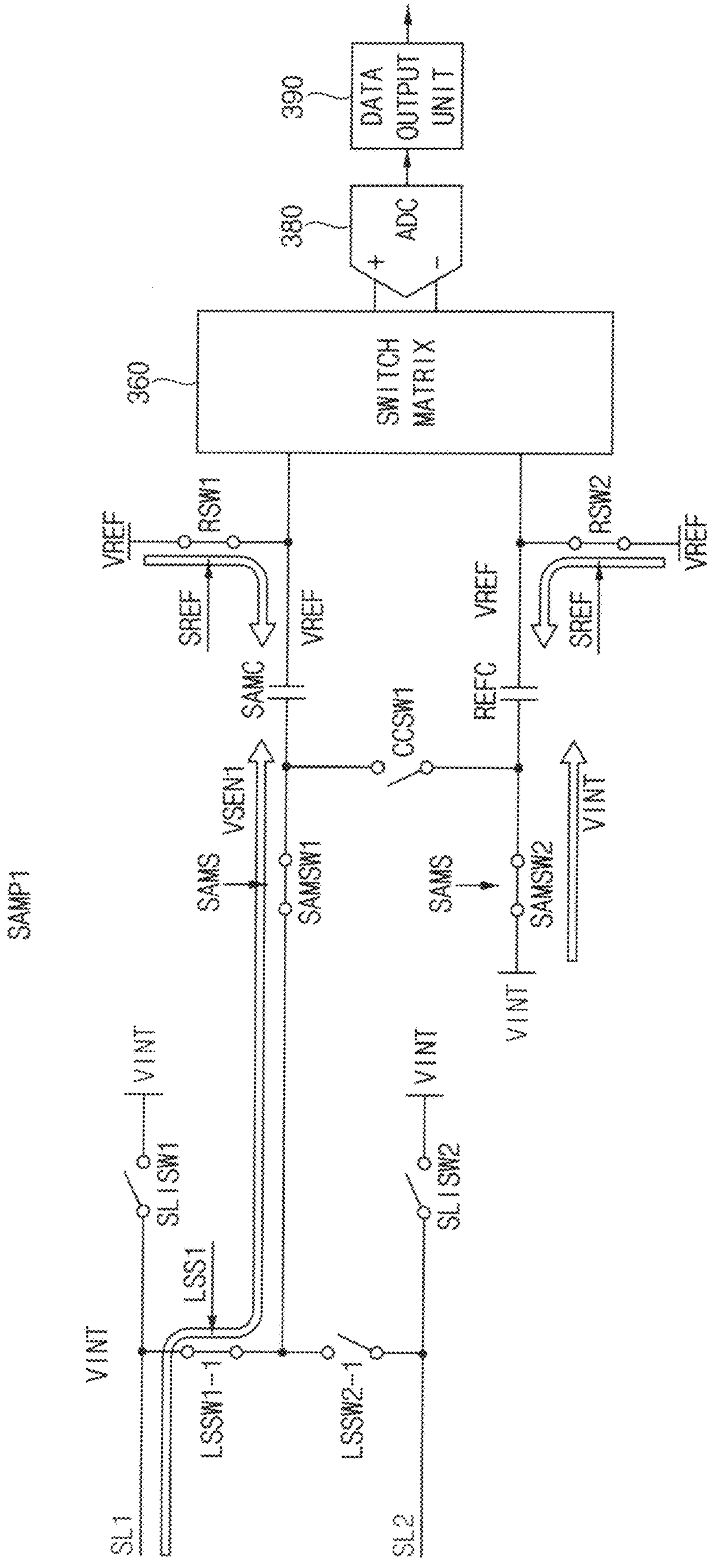
FIG. 10 is a diagram for describing an operation of a sensing circuit in a first sampling period.
Figure 11:
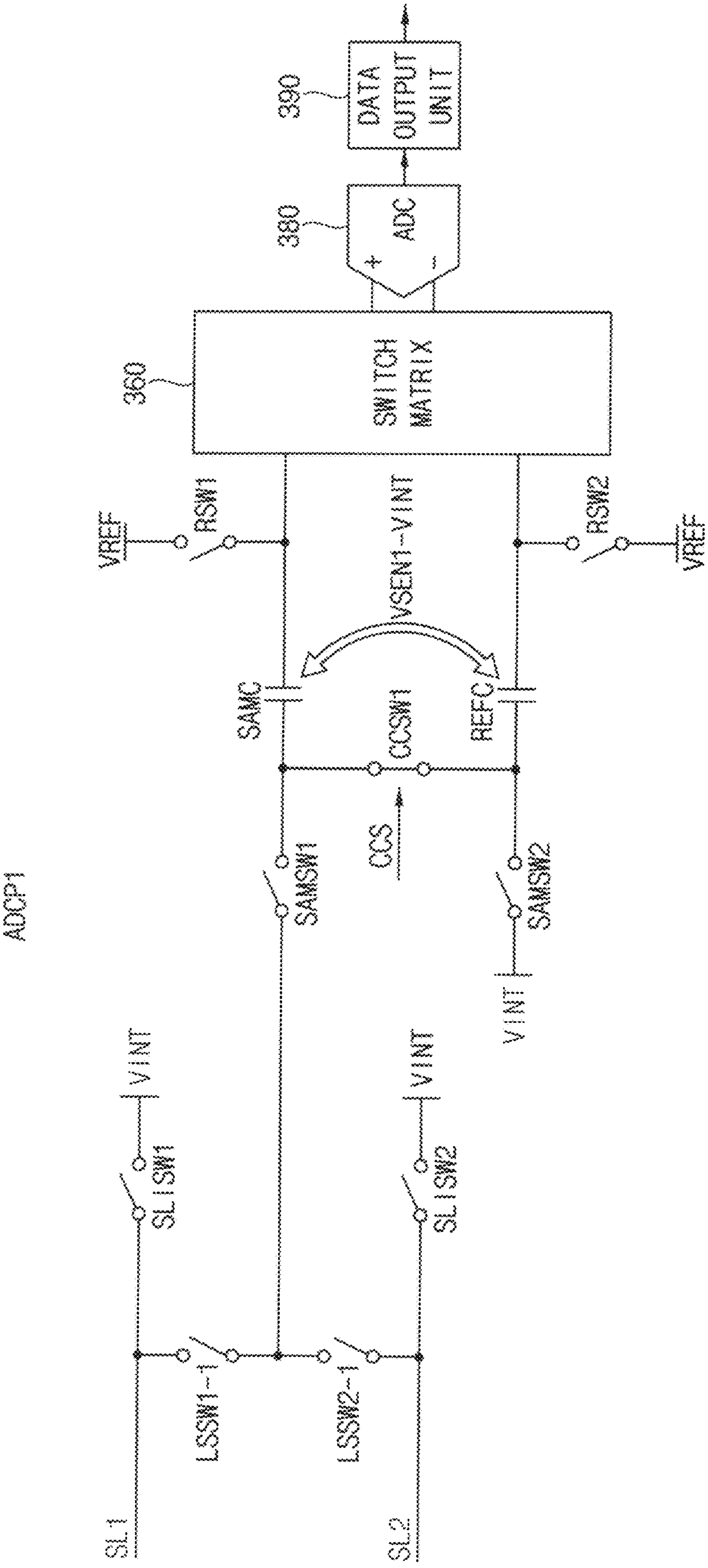
FIG. 11 is a diagram for describing an operation of a sensing circuit in a first analog-to-digital conversion period.
Figure 12:
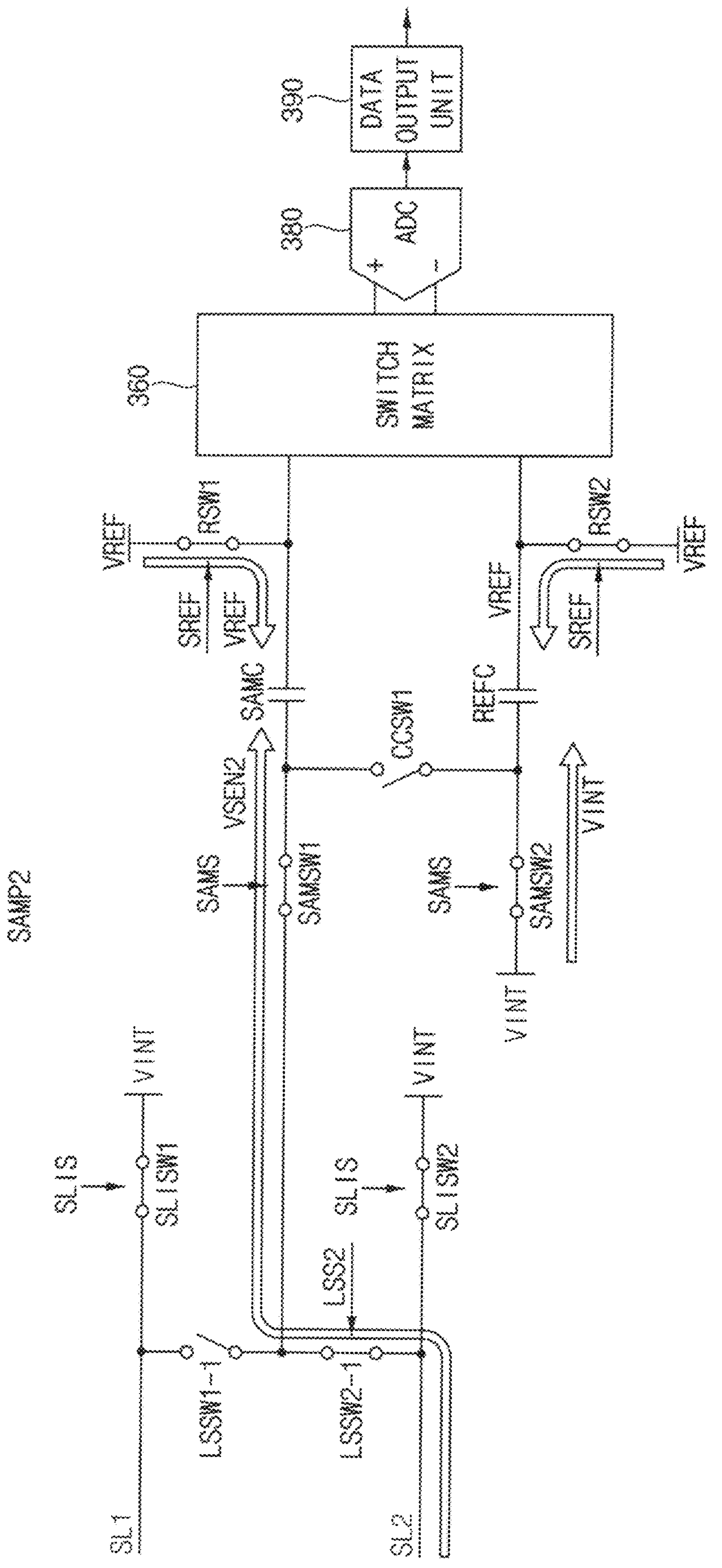
FIG. 12 is a diagram for describing an operation of a sensing circuit in a second sampling period.
Figure 13:
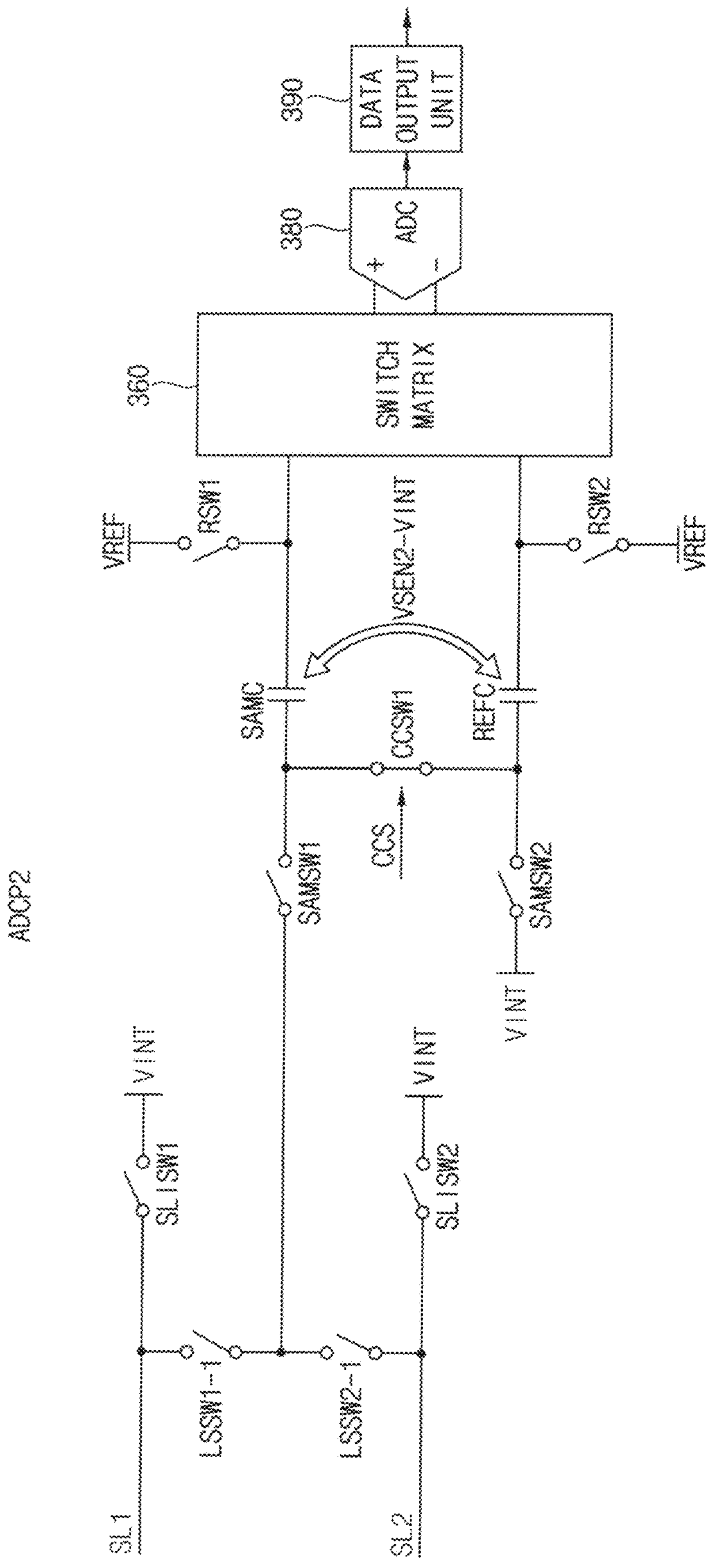
FIG. 13 is a diagram for describing an operation of a sensing circuit in a second analog-to-digital conversion period.
Figure 14:
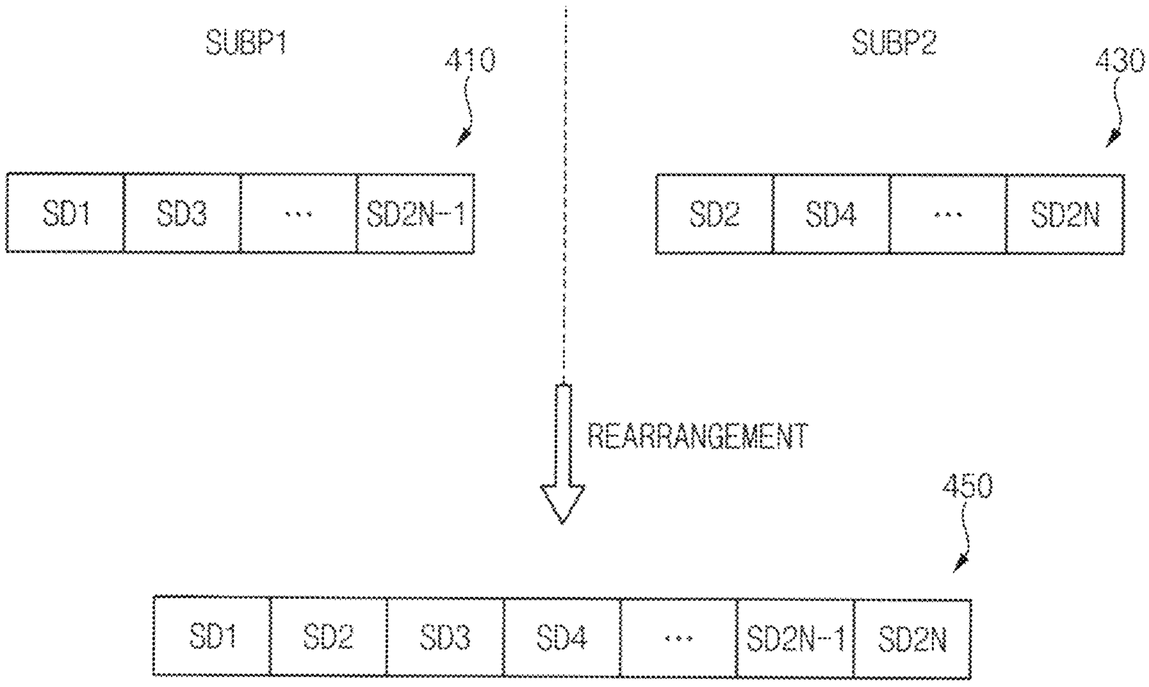
FIG. 14 is a diagram for describing an embodiment where first sensing data and second sensing data are rearranged.

FIG. 7 is a timing diagram for describing an embodiment of an operation of a sensing circuit in embodiments, FIG. 8 is a diagram for describing an operation of a sensing circuit in a sensing line initialization period, FIG. 9 is a diagram for describing an operation of a sensing circuit in a first capacitor initialization period, FIG. 10 is a diagram for describing an operation of a sensing circuit in a first sampling period, FIG. 11 is a diagram for describing an operation of a sensing circuit in a first analog-to-digital conversion period, FIG. 12 is a diagram for describing an operation of a sensing circuit in a second sampling period, FIG. 13 is a diagram for describing an operation of a sensing circuit in a second analog-to-digital conversion period, and FIG. 14 is a diagram for describing an embodiment where first sensing data and second sensing data are rearranged.

Referring to FIGS. 6 and 7, a sensing period SP for pixels in a selected pixel row may include a first sub-sensing period SUBP1 in which first sensing operations for a first portion of the pixels coupled to N odd-numbered sensing lines SL1, . . . , SL2N−1 are performed, a second sub-sensing period SUBP2 in which second sensing operations for a second portion of the pixels coupled to N even-numbered sensing lines SL2, . . . , SL2N are performed, and a data output period DOP in which sensing data SD for all the pixels in the selected pixel row are output. Hereinafter, for convenience of explanation, the first and second sensing operations for a first sensing line SL1 among the N odd-numbered sensing lines SL1, . . . , SL2N−1 and a second sensing line SL2 among the N even-numbered sensing lines SL2, . . . , SL2N will be described. The first sensing operations for the remaining sensing lines among the N odd-numbered sensing lines SL1, . . . , SL2N−1 may be substantially the same as the first sensing operation for the first sensing line SL1, and the second sensing operations for the remaining sensing lines among the N even-numbered sensing lines SL2, . . . , SL2N may be substantially the same as the second sensing operation for the second sensing line SL2.

The first sub-sensing period SUBP1 may include a sensing line initialization period SLIP, a first capacitor initialization period CIP1, a first sampling period SAMP1 and a first analog-to-digital conversion period ADCP1, and the second sub-sensing period SUBP2 may include a second sampling period SAMP2 and a second analog-to-digital conversion period ADCP2. In some embodiments, as illustrated in FIG. 7, the first capacitor initialization period CIP1 may overlap the sensing line initialization period SLIP, or may be within the sensing line initialization period SLIP.

In the sensing line initialization period SLIP, a sensing line initialization circuit 320 may substantially simultaneously initialize the first sensing line SL1 and the second sensing line SL2. In an embodiment, as illustrated in FIGS. 7 and 8, in the sensing line initialization period SLIP, a sensing line initialization signal SLIS may have an active level, a first sensing line initialization switch SLISW1 may apply an initialization voltage VINT to the first sensing line SL1 in response to the sensing line initialization signal SLIS having the active level, a second sensing line initialization switch SLISW2 may apply the initialization voltage VINT to the second sensing line SL2 in response to the sensing line initialization signal SLIS having the active level, and the first sensing line SL1 and the second sensing line SL2 may be initialized based on the initialization voltage VINT, for example. In an embodiment, the first sensing line SL1 and the second sensing line SL2 may have parasitic capacitors CL1 and CL2, respectively, but the disclosure is not limited thereto.

In the first capacitor initialization period CIP1, a sampling capacitor SAMC and a reference capacitor REFC may be initialized. In some embodiments, the first capacitor initialization period CIP1 may overlap a portion of the sensing line initialization period SLIP, or an end portion of the sensing line initialization period SLIP. In an embodiment, as illustrated in FIGS. 7 and 9, in the first capacitor initialization period CIP1, a sampling signal SAMS, a reference signal SREF and a channel connection signal CCS have the active level, for example. A second sampling switch SAMSW2 may be turned on in response to the sampling signal SAMS having the active level, and a first channel connection switch (also referred to as a channel connection switch) CCSW1 may be turned on in response to the channel connection signal CCS having the active level. Thus, the initialization voltage VINT may be applied to a first electrode of the reference capacitor REFC through the second sampling switch SAMSW2, and may be applied to a first electrode of the sampling capacitor SAMC through the second sampling switch SAMSW2 and the channel connection switch CCSW1. Further, a first reference switch RSW1 and a second reference switch RSW2 may be turned on in response to the reference signal SREF having the active level. A reference voltage VREF may be applied to a second electrode of the sampling capacitor SAMC through the first reference switch RSW1, and may be applied to a second electrode of the reference capacitor REFC through the second reference switch RSW2. Thus, the sampling capacitor SAMC and the reference capacitor REFC may be initialized or discharged based on the initialization voltage VINT and the reference voltage VREF. In some embodiments, the reference voltage VREF may have, but not limited to, a voltage level substantially the same as a voltage level of the initialization voltage VINT. In some embodiments, the sampling signal SAMS may have the active level after a first delay time TDLY1 from a start time point of the first sub-sensing period SUBP1. In this case, an activation time point of the sampling signal SAMS may be delayed by the first delay time TDLY1, and thus the first sensing operations may be stably performed. Further, in some embodiments, in the first capacitor initialization period CIP1, the sensing line initialization signal SLIS and a first line selection signal LSS1 also may have the active level, the initialization voltage VINT may be further applied to the first electrode of the sampling capacitor SAMC through the first sensing line initialization switch SLISW1, a first line selection switch LSSW1-1 and a first sampling switch SAMSW1, and may be further applied to the first electrode of the reference capacitor REFC through the first sensing line initialization switch SLISW1, the first line selection switch LSSW1-1, the first sampling switch SAMSW1 and the channel connection switch CCSW1.

In the first sampling period SAMP1, a voltage of the first sensing line SL1 may be saturated to a first sensing voltage VSEN1, a voltage of the second sensing line SL2 may be saturated to a second sensing voltage VSEN2, and a sensing channel 340-1 may sample the first sensing voltage VSEN1 of the first sensing line SL1. In an embodiment, as illustrated in FIGS. 7 and 10, in the first sampling period SAMP1, the first line selection signal LSS1, the sampling signal SAMS and the reference signal SREF have the active level, and a second line selection signal LSS2 and the channel connection signal CCS have an inactive level, for example. The first line selection switch LSSW1-1 may be turned on in response to the first line selection signal LSS1 having the active level, and the first sampling switch SAMSW1 and the second sampling switch SAMSW2 may be turned on in response to the sampling signal SAMS having the active level. Thus, the first sensing voltage VSEN1 of the first sensing line SL1 may be applied to the first electrode of the sampling capacitor SAMC through the first line selection switch LSSW1-1 and the first sampling switch SAMSW1, and the initialization voltage VINT may be applied to the first electrode of the reference capacitor REFC through the second sampling switch SAMSW2. Further, the first reference switch RSW1 and the second reference switch RSW2 may be turned on in response to the reference signal SREF having the active level. Thus, the reference voltage VREF may be applied to the second electrode of the sampling capacitor SAMC through the first reference switch RSW1, and may be applied to the second electrode of the reference capacitor REFC through the second reference switch RSW2.

In the first analog-to-digital conversion period ADCP1, a switch matrix 360 and an ADC 380 may sequentially convert N first sensing voltages VSEN1 of the N odd-numbered sensing lines SL1, . . . , SL2N−1 sampled by N sensing channels 340-1, . . . , 340-N or CH1, CH2, . . . , CHN into N first sensing data. In an embodiment, as illustrated in FIGS. 7 and 11, the channel connection signal CCS may have the active level, for example. The channel connection switch CCSW1 may couple the first electrode of the sampling capacitor SAMC and the first electrode of the reference capacitor REFC to each other in response to the channel connection signal CCS having the active level. Thus, the first electrode of the sampling capacitor SAMC and the first electrode of the reference capacitor REFC may have the same voltage (e.g., a voltage between the first sensing voltage VSEN1 and the initialization voltage VINT), and the second electrode of the sampling capacitor SAMC and the second electrode of the reference capacitor REFC may have a first voltage difference VSEN1-VINT calculated by subtracting the initialization voltage VINT from the first sensing voltage VSEN1. The switch matrix 360 may respectively couple the second electrode of the sampling capacitor SAMC and the second electrode of the reference capacitor REFC to a first input terminal and a second input terminal of the ADC 380, and the ADC 380 may convert the first voltage difference VSEN1-VINT into the first sensing data. In some embodiments, these analog-to-digital conversion operations by the switch matrix 360 and the ADC 380 may be sequentially performed in an order from a first sensing channel 340-1 or CH1 to an N-th sensing channel 340-N or CHN.

A data output unit 390 may sequentially store the N first sensing data generated by the ADC 380 in the first analog-to-digital conversion period ADCP1.

The second sensing line SL2 may be initialized in the sensing line initialization period SLIP, and then may not be additionally initialized until the second sampling period SAMP2. Thus, until the second sampling period SAMP2, the second sensing line SL2 may retain the second sensing voltage VSEN2 saturated in the first sampling period SAMP1. In the second sampling period SAMP2, the first sensing channel 340-1 may sample the second sensing voltage VSEN2 of the second sensing line SL2. In an embodiment, as illustrated in FIGS. 7 and 12, in the second sampling period SAMP2, the second line selection signal LSS2, the sampling signal SAMS and the reference signal SREF have the active level, and the first line selection signal LSS1 and the channel connection signal CCS may have the inactive level, for example. A second line selection switch LSSW2-1 may be turned on in response to the second line selection signal LSS2 having the active level, and the first sampling switch SAMSW1 and the second sampling switch SAMSW2 may be turned on in response to the sampling signal SAMS having the active level. Thus, the second sensing voltage VSEN2 of the second sensing line SL2 may be applied to the first electrode of the sampling capacitor SAMC through the second line selection switch LSSW2-1 and the first sampling switch SAMSW1, and the initialization voltage VINT may be applied to the first electrode of the reference capacitor REFC through the second sampling switch SAMSW2. Further, the first reference switch RSW1 and the second reference switch RSW2 may be turned on in response to the reference signal SREF having the active level. Thus, the reference voltage VREF may be applied to the second electrode of the sampling capacitor SAMC through the first reference switch RSW1, and may be applied to the second electrode of the reference capacitor REFC through the second reference switch RSW2. In some embodiments, the sampling signal SAMS may have the active level after a second delay time TDLY2 from a start time point of the second sub-sensing period SUBP2. In this case, an activation time point of the sampling signal SAMS may be delayed by the second delay time TDLY2, and thus the second sensing operations may be stably performed.

In the second analog-to-digital conversion period ADCP2, the switch matrix 360 and the ADC 380 may sequentially convert N second sensing voltages VSEN2 of the N even-numbered sensing lines SL2, . . . , SL2N sampled by the N sensing channels 340-1, . . . , 340-N or CH1, CH2, . . . , CHN into N second sensing data. In an embodiment, as illustrated in FIGS. 7 and 13, the channel connection signal CCS may have the active level, for example. The channel connection switch CCSW1 may couple the first electrode of the sampling capacitor SAMC and the first electrode of the reference capacitor REFC to each other in response to the channel connection signal CCS having the active level. Thus, the first electrode of the sampling capacitor SAMC and the first electrode of the reference capacitor REFC may have the same voltage (e.g., a voltage between the second sensing voltage VSEN2 and the initialization voltage VINT), and the second electrode of the sampling capacitor SAMC and the second electrode of the reference capacitor REFC may have a second voltage difference VSEN2-VINT calculated by subtracting the initialization voltage VINT from the second sensing voltage VSEN2. The switch matrix 360 may respectively couple the second electrode of the sampling capacitor SAMC and the second electrode of the reference capacitor REFC to the first input terminal and the second input terminal of the ADC 380, and the ADC 380 may convert the second voltage difference VSEN2-VINT into the second sensing data. In some embodiments, these analog-to-digital conversion operations by the switch matrix 360 and the ADC 380 may be sequentially performed in the order from the first sensing channel 340-1 or CH1 to the N-th sensing channel 340-N or CHN.

The data output unit 390 may sequentially store the N second sensing data generated by the ADC 380 in the second analog-to-digital conversion period ADCP2.

In the data output period DOP, the data output unit 390 may output the N first sensing data generated in the first sub-sensing period SUBP1 and the N second sensing data generated in the second sub-sensing period SUBP2. In an embodiment, as illustrated in FIG. 14, the first sensing data 410 or SD1, SD3, . . . , SD2N−1 for the N odd-numbered sensing lines SL1, SL2N−1 may be generated in the first sub-sensing period SUBP1, and the second sensing data 430 or SD2, SD4, . . . , SD2N for the N even-numbered sensing lines SL2, . . . , SL2N may be generated in the second sub-sensing period SUBP2, for example. In some embodiments, the data output unit 390 may rearrange the first sensing data 410 and the second sensing data 430, and may output rearranged sensing data 450. In an embodiment, the data output unit 390 may output the sensing data 450 rearranged in an order of sensing data SD1 for the first sensing line SL1, sensing data SD2 for the first sensing line SL2, sensing data SD3 for a third sensing line, sensing data SD4 for a fourth sensing line, . . . , sensing data SD2N−1 for an (2N−1)-th sensing line SL2N−1 and sensing data SD2N for an (2N)-th sensing line SL2N, for example.

As described above, unlike a conventional sensing circuit, the second sensing line SL2 may not be initialized during the period from the first sampling period SAMP1 to the second sampling period SAMP2, and thus a sensing time of the sensing circuit 300 may be reduced. Further, in some embodiments, the second sampling period SAMP2 may be shorter than the first sampling period SAMP1. In the sensing circuit 300 in embodiments, although the second sampling period SAMP2 is shorter than the first sampling period SAMP1, a time for charging (or saturating) the second sensing line SL2 is not desired during the second sampling period SAMP2 because the second sensing line SL2 is not initialized after the first sampling period SAMP1. Thus, accurate second sensing voltage VSEN2 may be sampled during the second sampling period SAMP2, and accurate sensing data may be generated.

Figure 15:
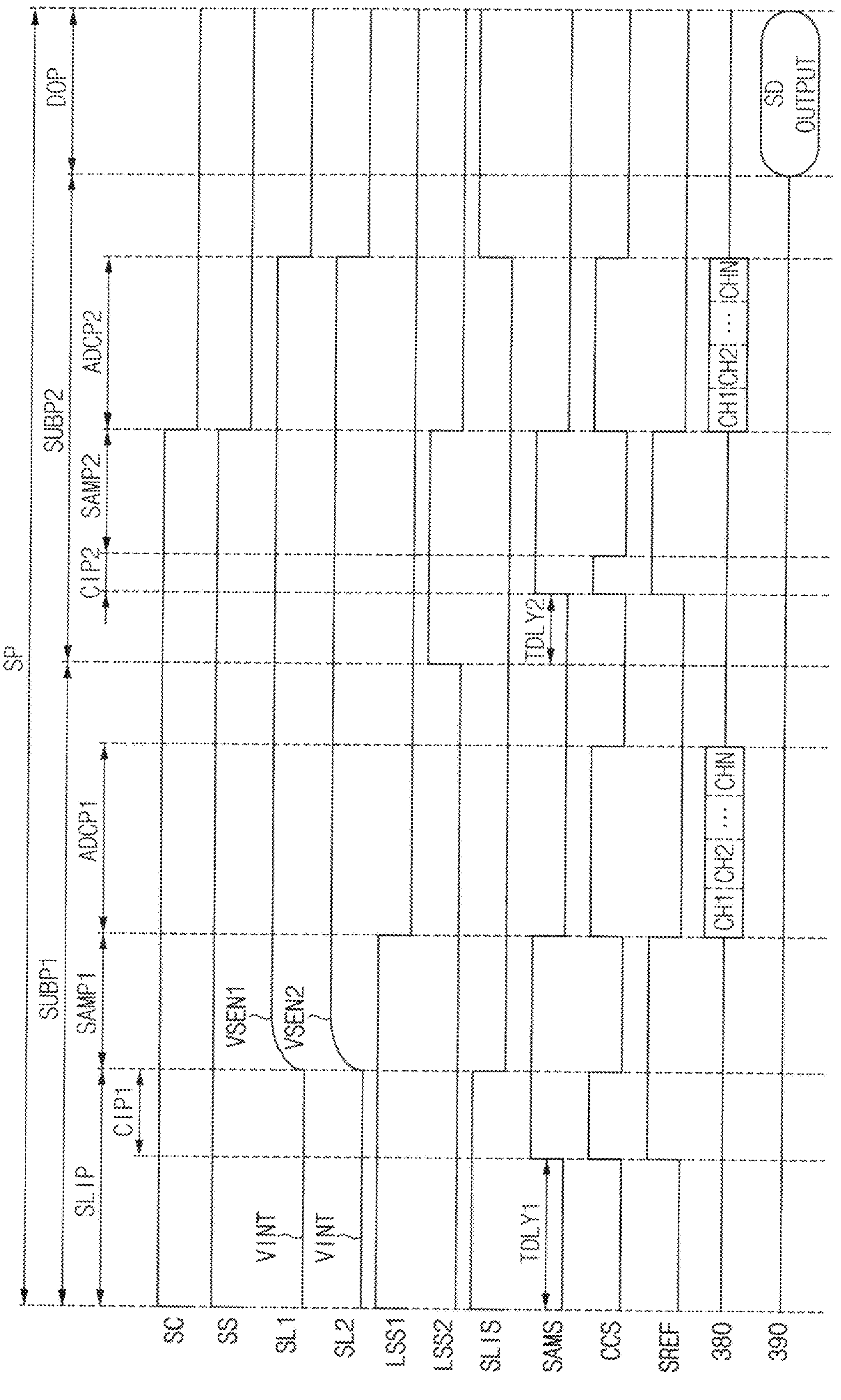
FIG. 15 is a timing diagram for describing an embodiment of an operation of a sensing circuit.

FIG. 15 is a timing diagram for describing an embodiment of an operation of a sensing circuit.

Referring to FIG. 15, a sensing period SP may include a first sub-sensing period SUBP1, a second sub-sensing period SUBP2 and a data output period DOP. The first sub-sensing period SUBP1 may include a sensing line initialization period SLIP, a first capacitor initialization period CIP1, a first sampling period SAMP1 and a first analog-to-digital conversion period ADCP1, and the second sub-sensing period SUBP2 may include a second capacitor initialization period CIP2, a second sampling period SAMP2 and a second analog-to-digital conversion period ADCP2. A timing diagram of FIG. 15 may be substantially the same as a timing diagram of FIG. 7, except that the second sub-sensing period SUBP2 may further include the second capacitor initialization period CIP2. In the second capacitor initialization period CIP2 before the second sampling period SAMP2, a sampling signal SAMS, a reference signal SREF and a channel connection signal CCS may have an active level, and a sampling capacitor of a sensing channel and a reference capacitor of a reference channel may be initialized.

Figure 16:
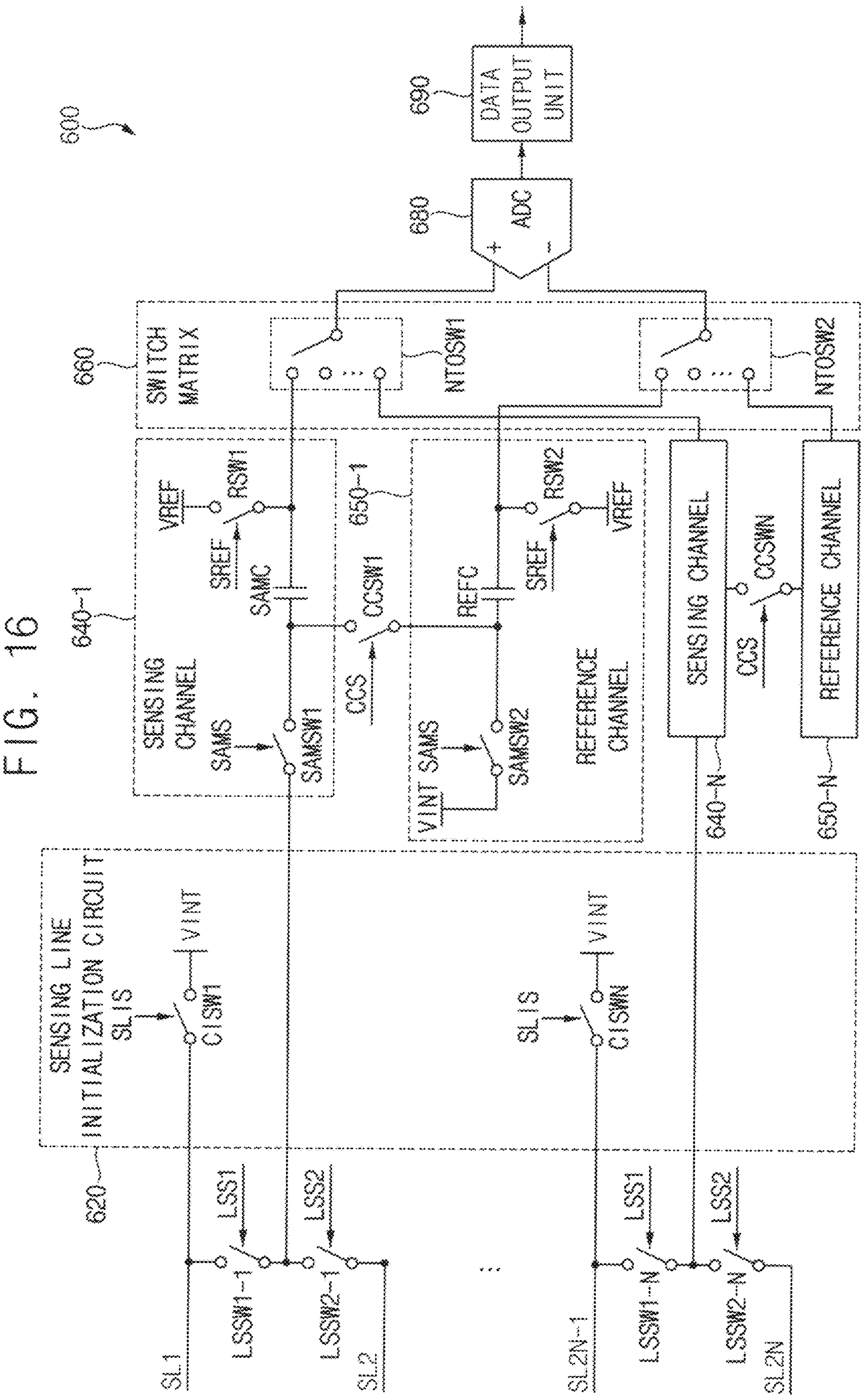
FIG. 16 is a diagram illustrating an embodiment of a sensing circuit.
Figure 17:
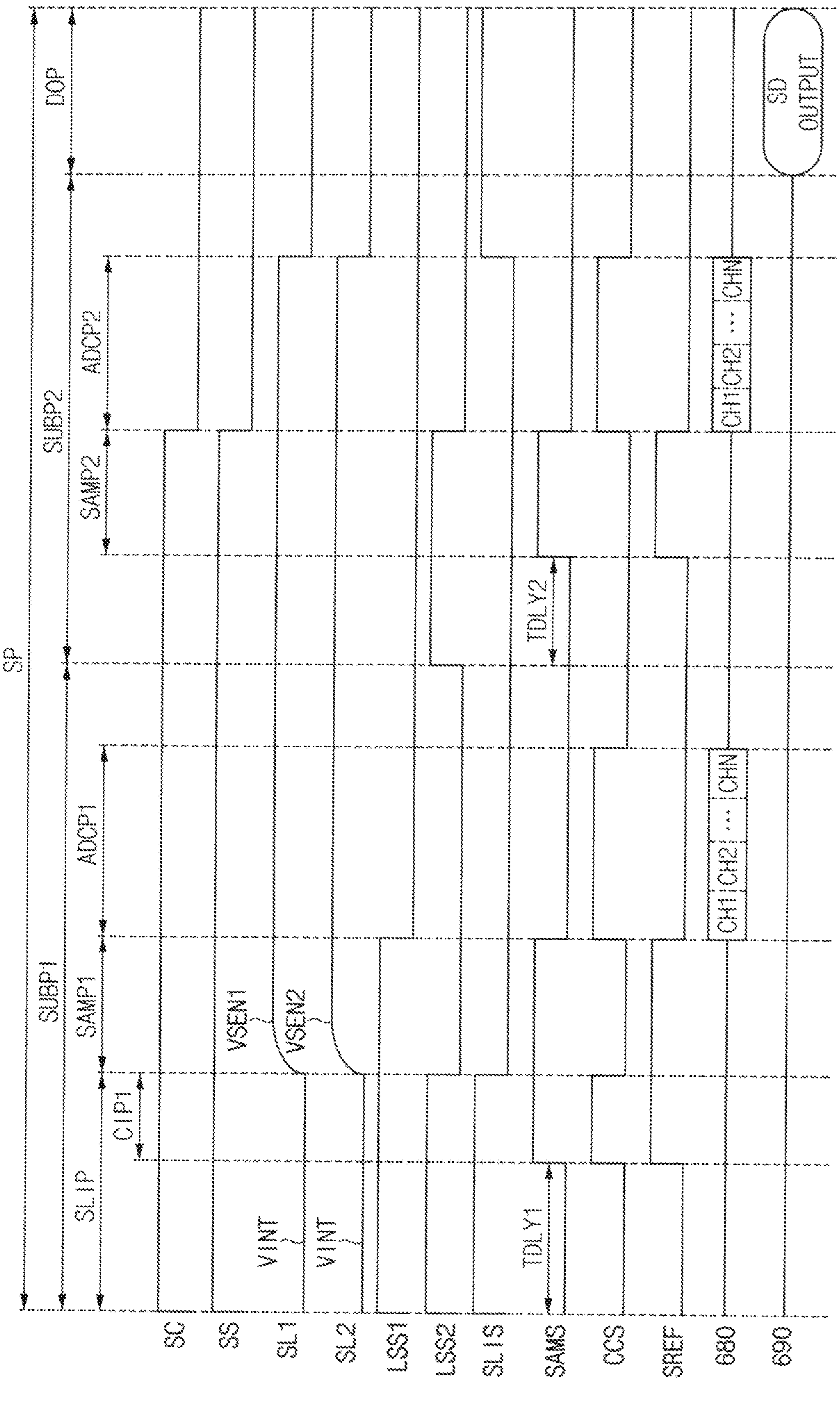
FIG. 17 is a timing diagram for describing an embodiment of an operation of a sensing circuit.

FIG. 16 is a diagram illustrating an embodiment of a sensing circuit, and FIG. 17 is a timing diagram for describing an embodiment of an operation of a sensing circuit.

Referring to FIG. 16, a sensing circuit 600 may include N first line selection switches LSSW1-1, . . . , LSSW1-N, N second line selection switches LSSW2-1, . . . , LSSW2-N, a sensing line initialization circuit 620, N sensing channels 640-1, . . . , 640-N, N reference channels 650-1, . . . , 650-N, N channel connection switches CCSW1, . . . , CCSWN, a switch matrix 660, an ADC 680 and a data output unit 690. The sensing circuit 600 of FIG. 16 may have a configuration substantially the same as a configuration of a sensing circuit 300 of FIG. 6, except that the sensing line initialization circuit 620 may include a common initialization switch (e.g., a first common initialization switch CISW1) that substantially simultaneously initialize two sensing lines (e.g., first and second sensing lines SL1 and SL2). Further, a timing diagram of FIG. 17 may be substantially the same as a timing diagram of FIG. 7, except that a second line selection signal LSS2 may have an active level during a sensing line initialization period SLIP.

The sensing line initialization circuit 620 may include N common initialization switch CISW1, . . . , CISWN, and each of the N common initialization switch CISW1, CISWN may initialize two sensing lines. In an embodiment, in the sensing line initialization period SLIP, a sensing line initialization signal SLIS, a first line selection signal LSS1 and the second line selection signal LSS2 may have the active level, and the N common initialization switch CISW1, . . . , CISWN, the N first line selection switches LSSW1-1, . . . , LSSW1-N and the N second line selection switches LSSW2-1, . . . , LSSW2-N may be turned on, for example. Each common initialization switch (e.g., the first common initialization switch CISW1) may apply an initialization voltage VINT to a corresponding odd-numbered sensing line (e.g., the first sensing line SL1), and may apply the initialization voltage VINT to a corresponding even-numbered sensing line (e.g., the second sensing line SL2) through a corresponding first line selection switch (e.g., a first line selection switch LSSW1-1) and a corresponding second line selection switch (e.g., a second line selection switch LSSW2-1). Thus, 2N sensing lines SL1 through SL2N may be substantially simultaneously initialized by the N common initialization switch CISW1, . . . , CISWN.

Figure 18:
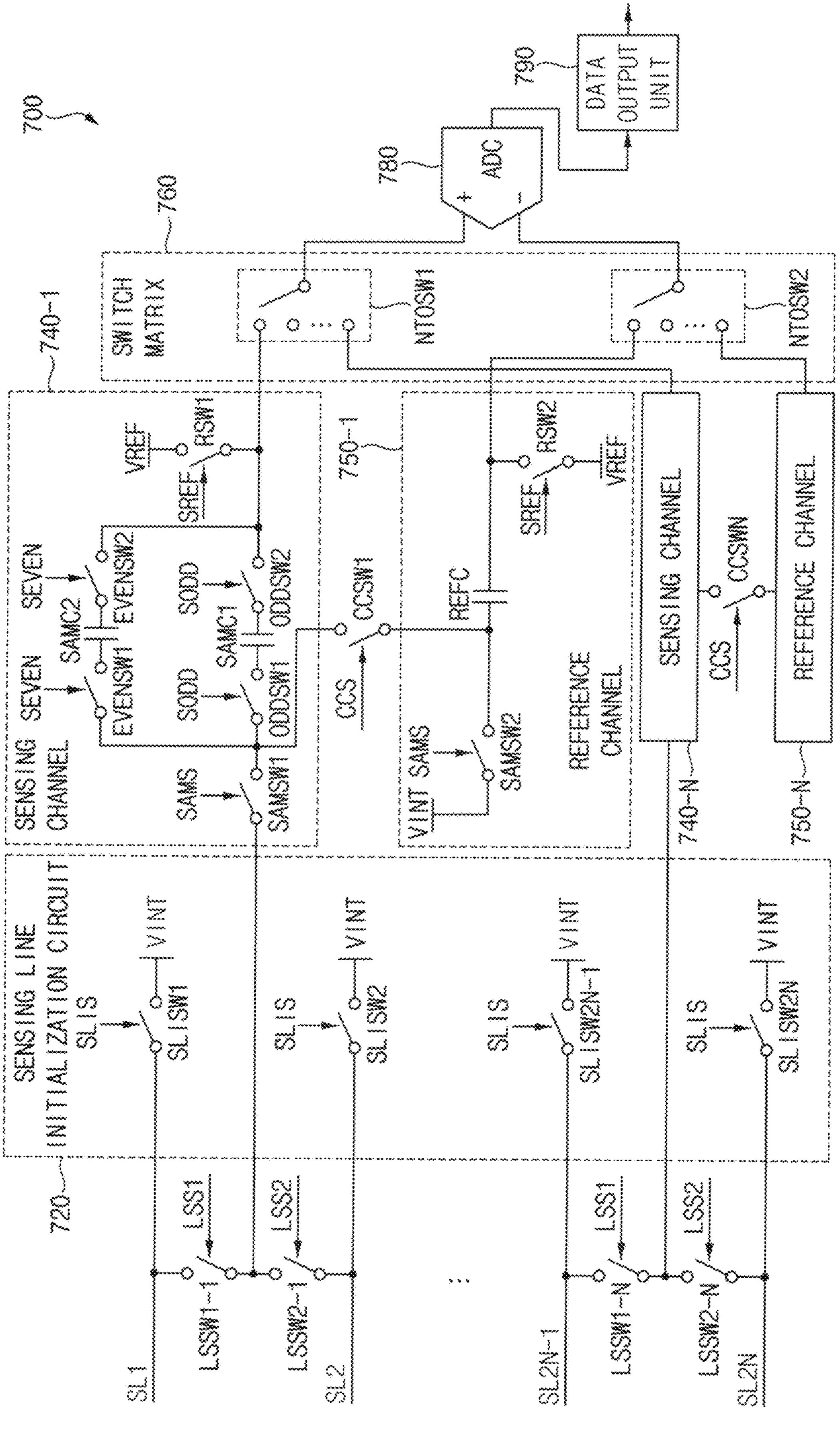
FIG. 18 is a diagram illustrating an embodiment of a sensing circuit.
Figure 19:
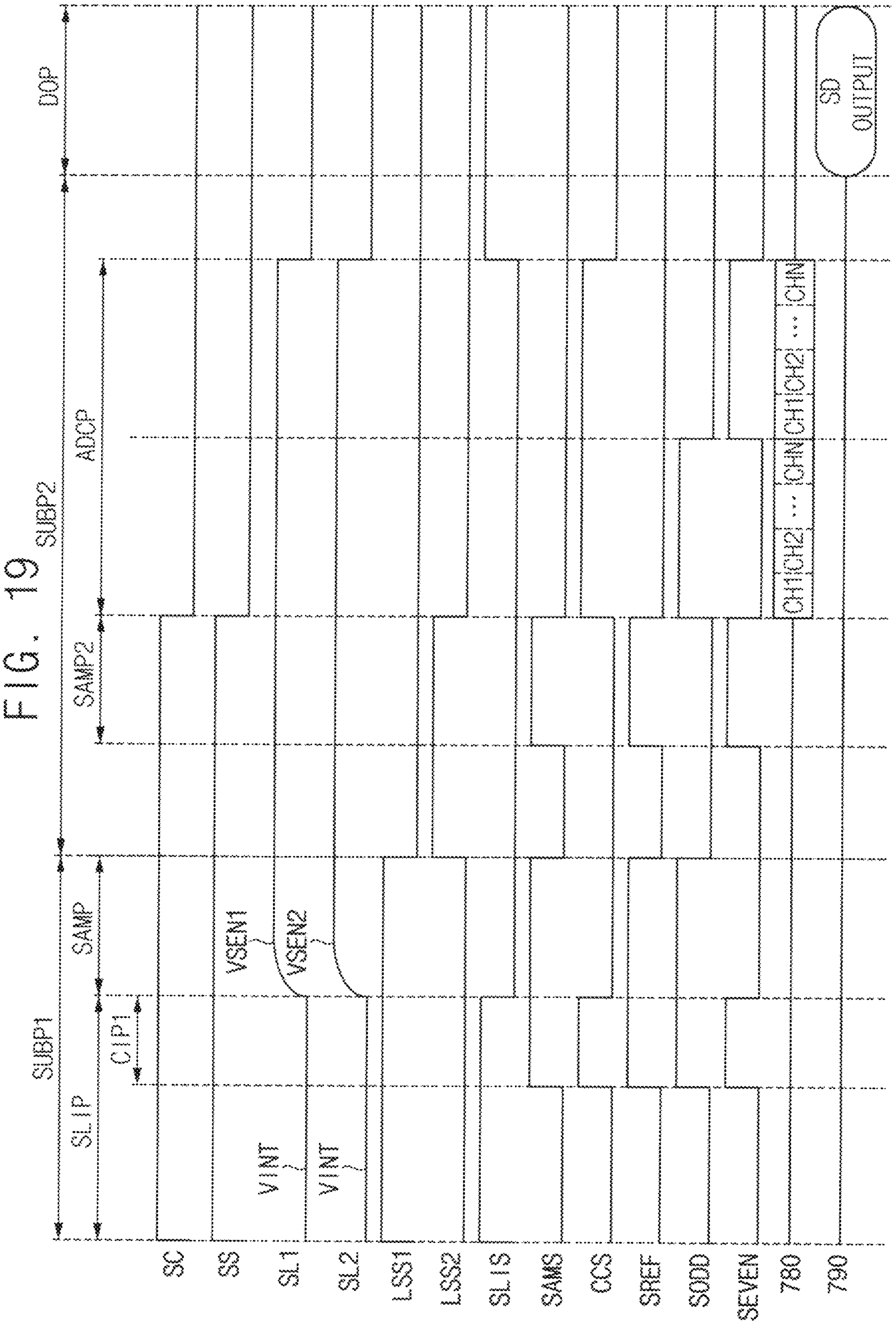
FIG. 19 is a timing diagram for describing an embodiment of an operation of a sensing circuit.

FIG. 18 is a diagram illustrating an embodiment of a sensing circuit, and FIG. 19 is a timing diagram for describing an embodiment of an operation of a sensing circuit.

Referring to FIG. 18, a sensing circuit 700 may include N first line selection switches LSSW1-1, . . . , LSSW1-N, N second line selection switches LSSW2-1, . . . , LSSW2-N, a sensing line initialization circuit 720, N sensing channels 740-1, . . . , 740-N, N reference channels 750-1, . . . , 750-N, N channel connection switches CCSW1, . . . , CCSWN, a switch matrix 760, an ADC 780 and a data output unit 790. The sensing circuit 700 of FIG. 18 may have a configuration substantially the same as a configuration of a sensing circuit 300 of FIG. 6, except that each sensing channel (e.g., a first sensing channel 740-1) may include two sampling capacitors (e.g., a first sampling capacitor SAMC1 and a second sampling capacitor SAMC2), and switches (e.g., first, second, third and fourth switches ODDSW1, ODDSW2, EVENSW1 and EVENSW2) for selectively coupling the two sampling capacitors. Further, a timing diagram of FIG. 19 may be substantially the same as a timing diagram of FIG. 7, except that a first sub-sensing period SUBP1 may not include an analog-to-digital conversion period, and a second sub-sensing period SUBP2 may include an analog-to-digital conversion period ADCP in which N sensing voltages of N odd-numbered sensing lines SL1, . . . , SL2N−1 and N sensing voltages of N even-numbered sensing lines SL2, . . . , SL2N are converted into 2N sensing data.

Each sensing channel (e.g., the first sensing channel 740-1) may include the first sampling capacitor SAMC1 for sampling a first sensing voltage of a first sensing line SL1 in the first sampling period SUBP1, and a second sampling capacitor SAMC2 for sampling a second sensing voltage of a second sensing line SL2 in the second sampling period SUBP2. Further, each sensing channel (e.g., the first sensing channel 740-1) may further include the first and second switches ODDSW1 and ODDSW2 that connect the first sampling capacitor SAMC1 in response to a first signal SODD, and the third and fourth switches EVENSW1 and EVENSW2 that connect the second sampling capacitor SAMC2 in response to a second signal SEVEN.

Referring to FIGS. 18 and 19, in a first capacitor initialization period CIP1, the first signal SODD and the second signal SEVEN may have an active level, and the first sampling capacitor SAMC1 and the second sampling capacitor SAMC2 may be initialized. In a first sampling period SAMP1, the first signal SODD may have the active level, the second signal SEVEN may have an inactive level, and the first sampling capacitor SAMC1 may store the first sensing voltage of the first sensing line SL1. In a second sampling period SAMP2, the first signal SODD may have the inactive level, the second signal SEVEN may have the active level, and the second sampling capacitor SAMC2 may store the second sensing voltage of the second sensing line SL2. In a first half of the analog-to-digital conversion period ADCP, N first sensing voltages stored in the first sampling capacitors SAMC1 of the N sensing channels 740-1, . . . , 740-N or CH1, CH2, . . . , CHN may be sequentially converted into N first sensing data. Further, in a second half of the analog-to-digital conversion period ADCP, N second sensing voltages stored in the second sampling capacitors SAMC2 of the N sensing channels 740-1, . . . , 740-N or CH1, CH2, . . . , CHN may be sequentially converted into N second sensing data.

Figure 20:
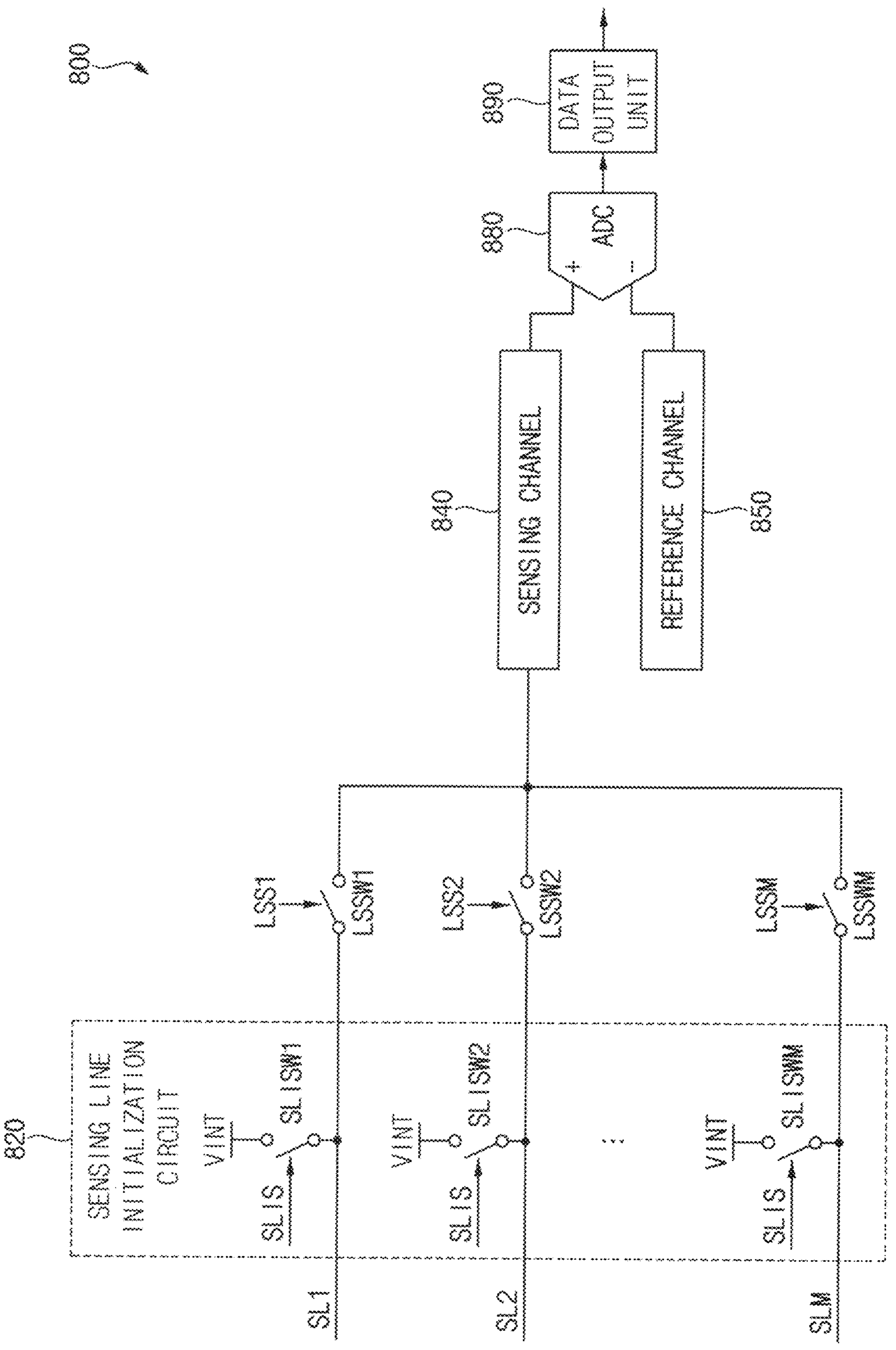
FIG. 20 is a diagram illustrating an embodiment of a sensing circuit.
Figure 21:
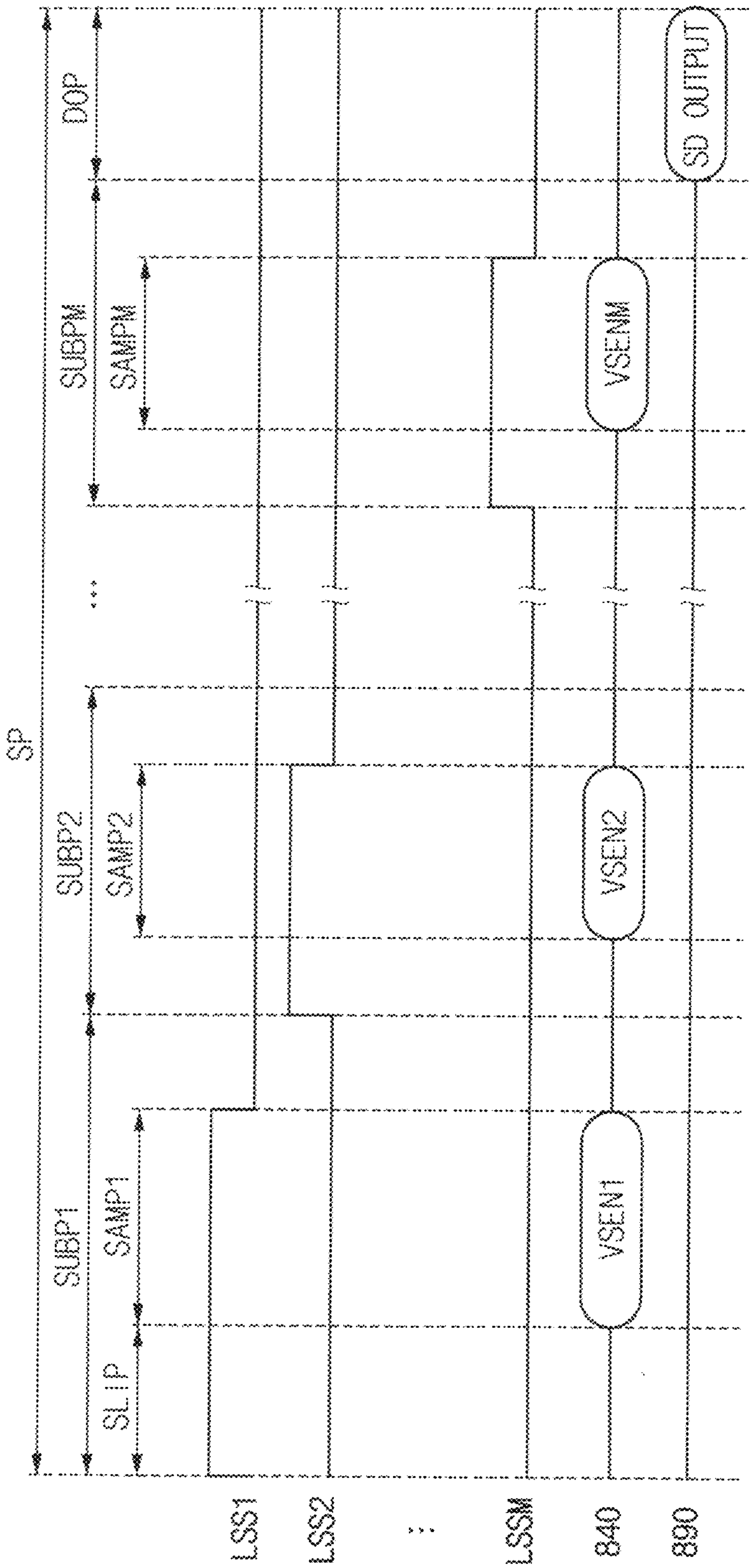
FIG. 21 is a timing diagram for describing an embodiment of an operation of a sensing circuit.

FIG. 20 is a diagram illustrating an embodiment of a sensing circuit, and FIG. 21 is a timing diagram for describing an embodiment of an operation of a sensing circuit.

Referring to FIG. 20, a sensing circuit 800 may include M line selection switches LSSW1, LSSW2, . . . , LSSWM, a sensing line initialization circuit 820 having M sensing line initialization switches SLISW1, SLISW2, . . . , SLISWM, a sensing channel 840, a reference channel 850, an ADC 880 and a data output unit 890, where M is an integer greater than 2.

In some embodiments, a display device including the sensing circuit 800 may include M sensing lines SL1, SL2, . . . , SLM, and the sensing circuit 800 may perform sensing operations for the M sensing lines SL1, SL2, . . . , SLM by the single sensing channel 840. That is, the sensing circuit 800 may perform the sensing operations for all sensing lines SL1, SL2, . . . , SLM of the display device by only one sensing channel 840. In other embodiments, a display device including the sensing circuit 800 may include L*M sensing lines, where L is an integer greater than 1, and the sensing circuit 800 may include L sensing channels 840, each of which may perform sensing operations for M sensing lines SL1, SL2, . . . , SLM.

Referring to FIGS. 20 and 21, a sensing period SP may include first through M-th sub-sensing periods SUBP1, SUBP2, . . . , SUBPM and a data output period DOP. First through M-th line selection signals LSS1, LSS2, . . . , LSSM may have an active level in the first through M-th sub-sensing periods SUBP1, SUBP2, . . . , SUBPM, respectively, and first through M-th line selection switches LSSW1, LSSW2, . . . , LSSWM may be turned on in the first through M-th sub-sensing periods SUBP1, SUBP2, . . . , SUBPM, respectively. The first sub-sensing period SUBP1 may include a sensing line initialization period SLIP and a first sampling period SAMP1, and the second through M-th sub-sensing periods SUBP2, . . . , SUBPM may respectively include second through M-th sampling periods SAMP2, . . . , SAMPM. In the sensing line initialization period SLIP, first through M-th sensing lines SL1, SL2, . . . , SLM may be substantially simultaneously initialized. The sensing channel 840 may sample a first sensing voltage VSEN1 of the first sensing line SL1 in the first sampling period SAMP1, may sample a second sensing voltage VSEN2 of the second sensing line SL2 in the second sampling period SAMP2, and may sample an M-th sensing voltage VSENM of the M-th sensing line SLM in the M-th sampling period SAMPM. In the data output period DOP, sensing data SD corresponding to the first through M-th sensing voltages VSEN1, VSEN2, . . . , VSENM may be output all at once.

Figure 22:
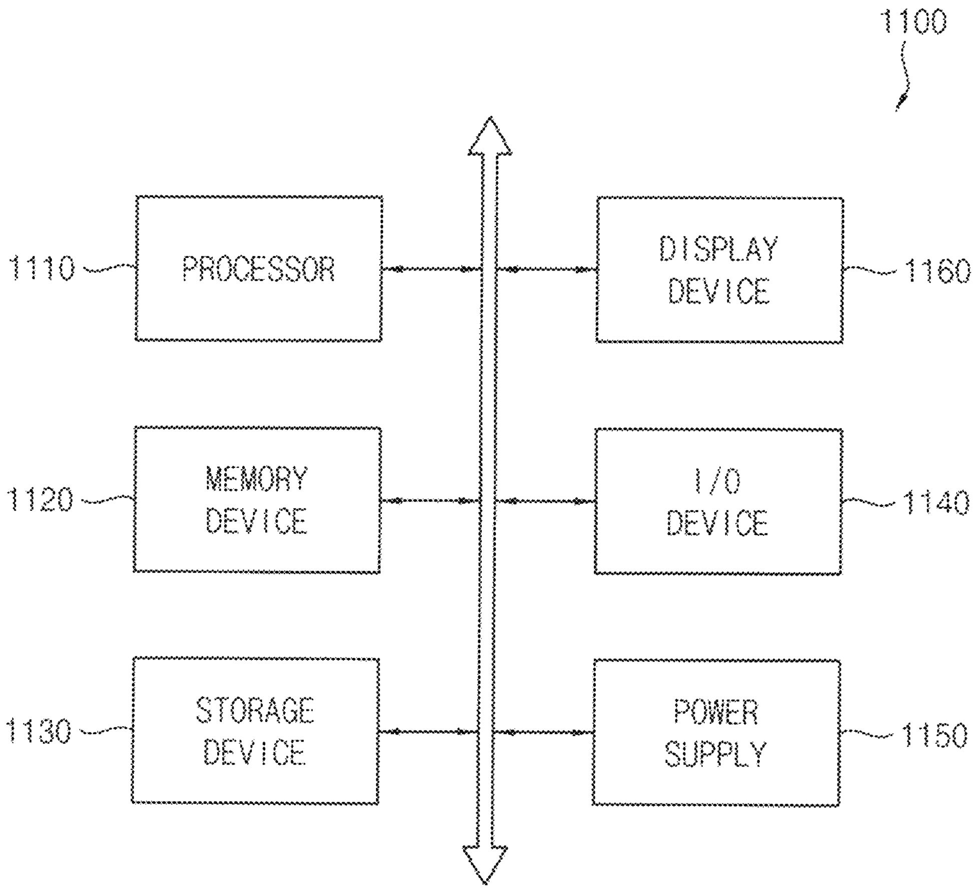
FIG. 22 is a block diagram illustrating an embodiment of an electronic device including a display device.

FIG. 22 is a block diagram illustrating an embodiment of an electronic device including a display device.

Referring to FIG. 22, an electronic device 1100 may include a processor 1110, a memory device 1120, a storage device 1130, an input/output ("I/O") device 1140, a power supply 1150, and a display device 1160. The electronic device 1100 may further include a plurality of ports for communicating with a video card, a sound card, a memory card, a universal serial bus ("USB") device, other electronic devices, etc.

The processor 1110 may perform various computing functions or tasks. The processor 1110 may be an application processor ("AP"), a microprocessor, a central processing unit ("CPU"), etc. The processor 1110 may be coupled to other components via an address bus, a control bus, a data bus, etc. Further, in some embodiments, the processor 1110 may be further coupled to an extended bus such as a peripheral component interconnection ("PCI") bus.

The memory device 1120 may store data for operations of the electronic device 1100. In an embodiment, the memory device 1120 may include at least one non-volatile memory device such as an erasable programmable read-only memory ("EPROM") device, an electrically erasable programmable read-only memory ("EEPROM") device, a flash memory device, a phase change random access memory ("PRAM") device, a resistance random access memory ("RRAM") device, a nano floating gate memory ("NFGM") device, a polymer random access memory ("PoRAM") device, a magnetic random access memory ("MRAM") device, a ferroelectric random access memory ("FRAM") device, etc., and/or at least one volatile memory device such as a dynamic random access memory ("DRAM") device, a static random access memory ("SRAM") device, a mobile dynamic random access memory ("mobile DRAM") device, etc., for example.

The storage device 1130 may be a solid state drive ("SSD") device, a hard disk drive ("HDD") device, a compact disc read-only memory ("CD-ROM") device, etc. The I/O device 1140 may be an input device such as a keyboard, a keypad, a mouse, a touch screen, etc., and an output device such as a printer, a speaker, etc. The power supply 1150 may supply power for operations of the electronic device 1100. The display device 1160 may be coupled to other components through the buses or other communication links.

In the display device 1160, a sensing circuit may perform a sensing operation for two or more sensing lines by one sensing channel. Accordingly, a size of the sensing circuit may be reduced. Further, the sensing channel may sample a first sensing voltage of a first sensing line in a first sampling period of a first sub-sensing period, and may sample a second sensing voltage of a second sensing line in a second sampling period of a second sub-sensing period. The second sensing line may not be initialized during a period from the first sampling period to the second sampling period. Accordingly, a sensing time of the sensing circuit may be reduced.

The inventive concepts may be applied to any electronic device 1100 including the display device 1160. In an embodiment, the inventive concepts may be applied to a television ("TV"), a digital TV, a three dimensional ("3D") TV, a smart phone, a wearable electronic device, a tablet computer, a mobile phone, a personal computer ("PC"), a home appliance, a laptop computer, a personal digital assistant ("PDA"), a portable multimedia player ("PMP"), a digital camera, a music player, a portable game console, a navigation device, etc., for example.

The foregoing is illustrative of embodiments and is not to be construed as limiting thereof. Although a few embodiments have been described, those skilled in the art will readily appreciate that many modifications are possible in the embodiments without materially departing from the novel teachings and advantages of the inventive concept. Accordingly, all such modifications are intended to be included within the scope of the inventive concept as defined in the claims. Therefore, it is to be understood that the foregoing is illustrative of various embodiments and is not to be construed as limited to the illustrative embodiments disclosed, and that modifications to the disclosed embodiments, as well as other embodiments, are intended to be included within the scope of the appended claims.

What is claimed is:

1. A sensing circuit of a display device, the sensing circuit configured to:

couple a first sensing line to a sensing channel in a first sub-sensing period of a sensing period;

sample a first sensing voltage of the first sensing line in a first sampling period of the first sub-sensing period;

couple a second sensing line to the sensing channel in a second sub-sensing period of the sensing period; and sample a second sensing voltage of the second sensing line in a second sampling period of the second sub-sensing period, wherein the second sampling period is shorter than the first sampling period.

2. The sensing circuit of claim 1, comprising:

the sensing channel which samples the first sensing voltage of the first sensing line in the first sampling period, and samples the second sensing voltage of the second sensing line in the second sampling period.

3. The sensing circuit of claim 2, further comprising:

a sensing line initialization circuit which initializes the first sensing line and the second sensing line in the first sub-sensing period, wherein the second sensing line is not initialized during a period from the first sampling period to the second sampling period.

4. The sensing circuit of claim 3, wherein, in the first sub-sensing period, after the first and second sensing lines are initialized, a voltage of the first sensing line becomes the first sensing voltage for a first pixel coupled to the first sensing line, and a voltage of the second sensing line becomes the second sensing voltage for a second pixel coupled to the second sensing line, and wherein the voltage of the second sensing line is maintained as the second sensing voltage until the second sampling period of the second sub-sensing period.

5. The sensing circuit of claim 3, wherein the sensing line initialization circuit includes:

a first sensing line initialization switch which applies an initialization voltage to the first sensing line in response to a sensing line initialization signal; and a second sensing line initialization switch which applies the initialization voltage to the second sensing line in response to the sensing line initialization signal.

6. The sensing circuit of claim 3, further comprising:

a first line selection switch which couples the first sensing line to the sensing channel in the first sub-sensing period; and a second line selection switch which couples the second sensing line to the sensing channel in the second sub-sensing period.

7. The sensing circuit of claim 6, wherein the sensing channel includes:

a sampling capacitor including a first electrode and a second electrode;

a first sampling switch which couples the first and second line selection switches to the first electrode of the sampling capacitor in response to a sampling signal; and a first reference switch which applies a reference voltage to the second electrode of the sampling capacitor in response to a reference signal.

8. The sensing circuit of claim 7, further comprising:

a reference channel including:

a reference capacitor including a first electrode and a second electrode;

a second sampling switch which applies an initialization voltage to the first electrode of the reference capacitor in response to the sampling signal; and a second reference switch which applies the reference voltage to the second electrode of the reference capacitor in response to the reference signal; and a channel connection switch which couples the first electrode of the sampling capacitor and the first electrode of the reference capacitor to each other in response to a channel connection signal.

9. The sensing circuit of claim 8, further comprising:

an analog-to-digital converter; and a switch matrix which couples the sensing channel and the reference channel to the analog-to-digital converter.

10. The sensing circuit of claim 9, wherein the sensing period includes:

the first sub-sensing period in which a first sensing operation for a first pixel coupled to the first sensing line is performed;

the second sub-sensing period in which a second sensing operation for a second pixel coupled to the second sensing line is performed; and a data output period in which first sensing data corresponding to the first sensing voltage and second sensing data corresponding to the second sensing voltage are output, wherein the first sub-sensing period includes:

a sensing line initialization period in which the first sensing line and the second sensing line are substantially simultaneously initialized;

a first capacitor initialization period in which the sampling capacitor and the reference capacitor are initialized;

the first sampling period in which the first sensing voltage of the first sensing line is sampled; and a first analog-to-digital conversion period in which the first sensing voltage is converted into the first sensing data, and wherein the second sub-sensing period includes:

the second sampling period in which the second sensing voltage of the second sensing line is sampled; and a second analog-to-digital conversion period in which the second sensing voltage is converted into the second sensing data.

11. The sensing circuit of claim 10, wherein, in the sensing line initialization period, a sensing line initialization signal has an active level, and wherein the sensing line initialization circuit applies the initialization voltage to the first sensing line and the second sensing line in response to the sensing line initialization signal having the active level.

12. The sensing circuit of claim 10, wherein, in the first capacitor initialization period, the sampling signal, the reference signal and the channel connection signal have an active level, wherein the second sampling switch is turned on in response to the sampling signal having the active level, the channel connection switch is turned on in response to the channel connection signal having the active level, the initialization voltage is applied to the first electrode of the reference capacitor through the second sampling switch, and the initialization voltage is applied to the first electrode of the sampling capacitor through the second sampling switch and the channel connection switch, and wherein the first reference switch and the second reference switch are turned on in response to the reference signal having the active level, the reference voltage is applied to the second electrode of the sampling capacitor through the first reference switch, and the reference voltage is applied to the second electrode of the reference capacitor through the second reference switch.

13. The sensing circuit of claim 10, wherein the first capacitor initialization period overlaps the sensing line initialization period.

14. The sensing circuit of claim 10, wherein, in the first sampling period, a first line selection signal, the sampling signal and the reference signal have an active level, and a second line selection signal and the channel connection signal have an inactive level, wherein the first line selection switch is turned on in response to the first line selection signal having the active level, the first sampling switch and the second sampling switch are turned on in response to the sampling signal having the active level, the first sensing voltage of the first sensing line is applied to the first electrode of the sampling capacitor through the first line selection switch and the first sampling switch, and the initialization voltage is applied to the first electrode of the reference capacitor through the second sampling switch, and wherein the first reference switch and the second reference switch are turned on in response to the reference signal having the active level, the reference voltage is applied to the second electrode of the sampling capacitor through the first reference switch, and the reference voltage is applied to the second electrode of the reference capacitor through the second reference switch.

15. The sensing circuit of claim 10, wherein, in the first analog-to-digital conversion period, the channel connection signal has an active level, wherein the channel connection switch couples the first electrode of the sampling capacitor and the first electrode of the reference capacitor to each other in response to the channel connection signal having the active level, and the second electrode of the sampling capacitor and the second electrode of the reference capacitor have a first voltage difference between the first sensing voltage and the initialization voltage, and wherein the switch matrix couples the second electrode of the sampling capacitor and the second electrode of the reference capacitor to the analog-to-digital converter, and the analog-to-digital converter converts the first voltage difference into the first sensing data.

16. The sensing circuit of claim 10, wherein, in the second sampling period, a second line selection signal, the sampling signal and the reference signal have an active level, and a first line selection signal and the channel connection signal have an inactive level, wherein the second line selection switch is turned on in response to the second line selection signal having the active level, the first sampling switch and the second sampling switch are turned on in response to the sampling signal having the active level, the second sensing voltage of the second sensing line is applied to the first electrode of the sampling capacitor through the second line selection switch and the first sampling switch, and the initialization voltage is applied to the first electrode of the reference capacitor through the second sampling switch, and wherein the first reference switch and the second reference switch are turned on in response to the reference signal having the active level, the reference voltage is applied to the second electrode of the sampling capacitor through the first reference switch, and the reference voltage is applied to the second electrode of the reference capacitor through the second reference switch.

17. The sensing circuit of claim 10, wherein, in the second analog-to-digital conversion period, the channel connection signal has an active level, wherein the channel connection switch couples the first electrode of the sampling capacitor and the first electrode of the reference capacitor to each other in response to the channel connection signal having the active level, and the second electrode of the sampling capacitor and the second electrode of the reference capacitor have a second voltage difference between the second sensing voltage and the initialization voltage, and wherein the switch matrix couples the second electrode of the sampling capacitor and the second electrode of the reference capacitor to the analog-to-digital converter, and the analog-to-digital converter converts the second voltage difference into the second sensing data.

18. The sensing circuit of claim 10, wherein the second sub-sensing period further includes:

a second capacitor initialization period in which the sampling capacitor and the reference capacitor are initialized.

19. The sensing circuit of claim 1, wherein a display panel of the display device includes N odd-numbered sensing lines including the first sensing line and N even-numbered sensing lines including the second sensing line, where N is an integer greater than 0, wherein the sensing circuit comprises:

a sensing line initialization circuit which initializes the N odd-numbered sensing lines and the N even-numbered sensing lines;

N sensing channels including the sensing channel;

N first line selection switches which couple the N odd-numbered sensing lines to the N sensing channels in the first sub-sensing period;

N second line selection switches which couple the N even-numbered sensing lines to the N sensing channels in the second sub-sensing period;

an analog-to-digital converter; and a switch matrix which sequentially couples the N sensing channels to the analog-to-digital converter in a first analog-to-digital conversion period of the first sub-sensing period, and sequentially couples the N sensing channels to the analog-to-digital converter in a second analog-to-digital conversion period of the second sub-sensing period, and wherein the analog-to-digital converter sequentially converts N first sensing voltages of the N odd-numbered sensing lines into N first sensing data in the first analog-to-digital conversion period, and sequentially converts N second sensing voltages of the N even-numbered sensing lines into N second sensing data in the second analog-to-digital conversion period.

20. The sensing circuit of claim 19, further comprising:

a data output unit which sequentially stores the N first sensing data in the first analog-to-digital conversion period, sequentially stores the N second sensing data in the second analog-to-digital conversion period, and outputs the N first sensing data and the N second sensing data in a data output period of the sensing period.

21. The sensing circuit of claim 20, wherein the data output unit rearranges the N first sensing data and the N second sensing data such that each of the N second sensing data is disposed between adjacent two of the N first sensing data.

22. The sensing circuit of claim 1, comprising:

a common initialization switch which applies an initialization voltage to the first sensing line and the second sensing line.

23. The sensing circuit of claim 1, comprising:

the sensing channel including:

a first sampling capacitor which samples the first sensing voltage of the first sensing line in the first sampling period; and a second sampling capacitor which samples the second sensing voltage of the second sensing line in the second sampling period.

24. The sensing circuit of claim 1, wherein a display panel of the display device includes M sensing lines including the first sensing line and the second sensing line, and the sensing period includes M sub-sensing periods including the first sub-sensing period and the second sub-sensing period, where M is an integer greater than 2, wherein the sensing circuit comprises:

M line selection switches which couple the sensing channel to the M sensing lines in the M sub-sensing periods, respectively, and wherein the sensing channel sequentially samples M sensing voltages of the M sensing lines in the M sub-sensing periods.

25. A display device comprising:

a display panel including a plurality of pixels;

a scan driver which provides a scan signal and a sensing signal to a corresponding pixel of the plurality of pixels;

a data driver which provides a data signal to the corresponding pixel of the plurality of pixels;

a sensing circuit coupled to the plurality of pixels through a plurality of sensing lines, the sensing circuit configured to:

couple a first sensing line of the plurality of sensing lines to a sensing channel in a first sub-sensing period of a sensing period;

sample a first sensing voltage of the first sensing line in a first sampling period of the first sub-sensing period;

couple a second sensing line of the plurality of sensing lines to the sensing channel in a second sub-sensing period of the sensing period; and sample a second sensing voltage of the second sensing line in a second sampling period of the second sub-sensing period; and a controller which controls the scan driver, the data driver and the sensing circuit, wherein the second sampling period is shorter than the first sampling period.

26. The display device of claim 25, wherein the sensing circuit initializes the first sensing line and the second sensing line in the first sub-sensing period, and wherein the second sensing line is not initialized during a period from the first sampling period to the second sampling period.

27. A method of operating a sensing circuit of a display device, the method comprising:

coupling a first sensing line to a sensing channel in a first sub-sensing period of a sensing period;

sampling a first sensing voltage of the first sensing line by the sensing channel in a first sampling period of the first sub-sensing period;

coupling a second sensing line to the sensing channel in a second sub-sensing period of the sensing period; and sampling a second sensing voltage of the second sensing line by the sensing channel in a second sampling period of the second sub-sensing period, wherein the second sampling period is shorter than the first sampling period.

28. The method of claim 27, further comprising:

initializing a first sensing line and a second sensing line in a first sub-sensing period of a sensing period, wherein the second sensing line is not initialized during a period from the first sampling period to the second sampling period.

* * * * *